(12) United States Patent
Hess

(10) Patent No.: US 11,778,269 B1
(45) Date of Patent: Oct. 3, 2023

(54) PERCEPTUAL THRESHOLD TRIGGER

(71) Applicant: Miles C. Hess, Beavercreek, OH (US)

(72) Inventor: Miles C. Hess, Beavercreek, OH (US)

(*) Notice: Subject to any disclaimer, the term of this patent is extended or adjusted under 35 U.S.C. 154(b) by 0 days.

(21) Appl. No.: 17/976,283

(22) Filed: Oct. 28, 2022

Related U.S. Application Data

(60) Provisional application No. 63/273,752, filed on Oct. 29, 2021.

(51) Int. Cl.
*H04N 21/442* (2011.01)
*H04N 21/2387* (2011.01)

(52) U.S. Cl.
CPC ... *H04N 21/44218* (2013.01); *H04N 21/2387* (2013.01)

(58) Field of Classification Search
None
See application file for complete search history.

(56) References Cited

U.S. PATENT DOCUMENTS

| | | | | |
|---|---|---|---|---|
| 2002/0077986 A1* | 6/2002 | Kobata | ............... | H04L 63/10 705/52 |
| 2005/0114896 A1* | 5/2005 | Hug | ............ | H04N 21/25816 725/90 |
| 2016/0099854 A1* | 4/2016 | Swaminathan | .... | H04N 21/4826 709/224 |
| 2020/0175056 A1* | 6/2020 | Fox | ................. | A61B 5/4848 |
| 2020/0275160 A1* | 8/2020 | Spikes | ............... | H04L 67/34 |
| 2021/0143982 A1* | 5/2021 | Shah | .................. | G09B 5/12 |

* cited by examiner

*Primary Examiner* — Quang N Nguyen
(74) *Attorney, Agent, or Firm* — Thomas E. Lees, LLC

(57) ABSTRACT

Consumption of online content is tracked to increase a likelihood that the user is paying attention. A request is received from a remote processing device to begin receiving content, and a block of content is assembled, the block of content having a known content playback duration. Additionally, a post block verification duration is associated with the block of content. The assembled block of content is communicated to the remote processing device for playback thereon, and a perception indicator is collected during playback of the block of content. The collected perception indicator is compared against a perception threshold. Also, a post block verification is performed immediately after playback of the block of content for the post block verification duration. A contingency result is then determined based upon the comparison of the perception indicator to the perception threshold, and whether a valid feedback is received within the post block verification duration.

19 Claims, 14 Drawing Sheets

PERCEPTUAL THRESHOLD TRIGGER

CROSS REFERENCE TO RELATED APPLICATIONS

This application claims the benefit of U.S. Provisional Patent Application Ser. No. 63/273,752, filed Oct. 29, 2021, having the title PERCEPTUAL THRESHOLD TRIGGER, the disclosure of which is hereby incorporated herein by reference in its entirety.

BACKGROUND

Various aspects of the present disclosure relate generally to automated workflow triggers, and more specifically to an automated workflow trigger based upon a perceptual threshold.

Various on-line, computer-based platforms enable a user to consume digital content, such as advertisements, commercials, promotions, informational content, etc. Moreover, digital content can be accessed via websites, social media platforms, entertainment platforms, and other on-line resources.

BRIEF SUMMARY

According to aspects of the present disclosure, a method of detecting a user's attention when consuming digital (e.g., online) content is provided. The method comprises electronically communicating a block of content to a remote processing device, and electronically detecting a perception indicator of a user interacting with the block of content on the remote processing device. Here, the perception indicator corresponds to a detection of attention paid by the user to the block of content on the remote processing device. The method also comprises generating a contingency result. The contingency result is based upon a comparison of the perception indicator to a perception threshold. Moreover, the method comprise sending a communication to at least one of the remote processing device or a remote server associated with the block of content, where the communication comprises an indicator of the contingency result.

According to further aspects of the present disclosure, a method of tracking a user's consumption of online content is provided. The method comprises communicating a block of content to a remote processing device for playback thereon, where the block of content has a known content playback duration, and the block of content has associated therewith, a post block verification duration. For instance, the method can optionally comprise receiving a request from the remote processing device to begin receiving content, assembling the block of content based upon the received request where the block of content has a known content playback duration, associating the post block verification duration to the block of content, or a combination thereof.

The method further comprises collecting, during playback of the block of content on the remote processing device, a perception indicator, and comparing the collected perception indicator against a perception threshold. Still further, the method comprises performing a post block verification, where the post block verification begins immediately after playback of the block of content and lasts the post block verification duration. The method also comprises receiving feedback during the post block verification process. Additionally, the method comprises determining a contingency result, where the contingency result is based upon the comparison of the perception indicator to the perception threshold, and the received feedback.

DETAILED DESCRIPTION

Figure 1:
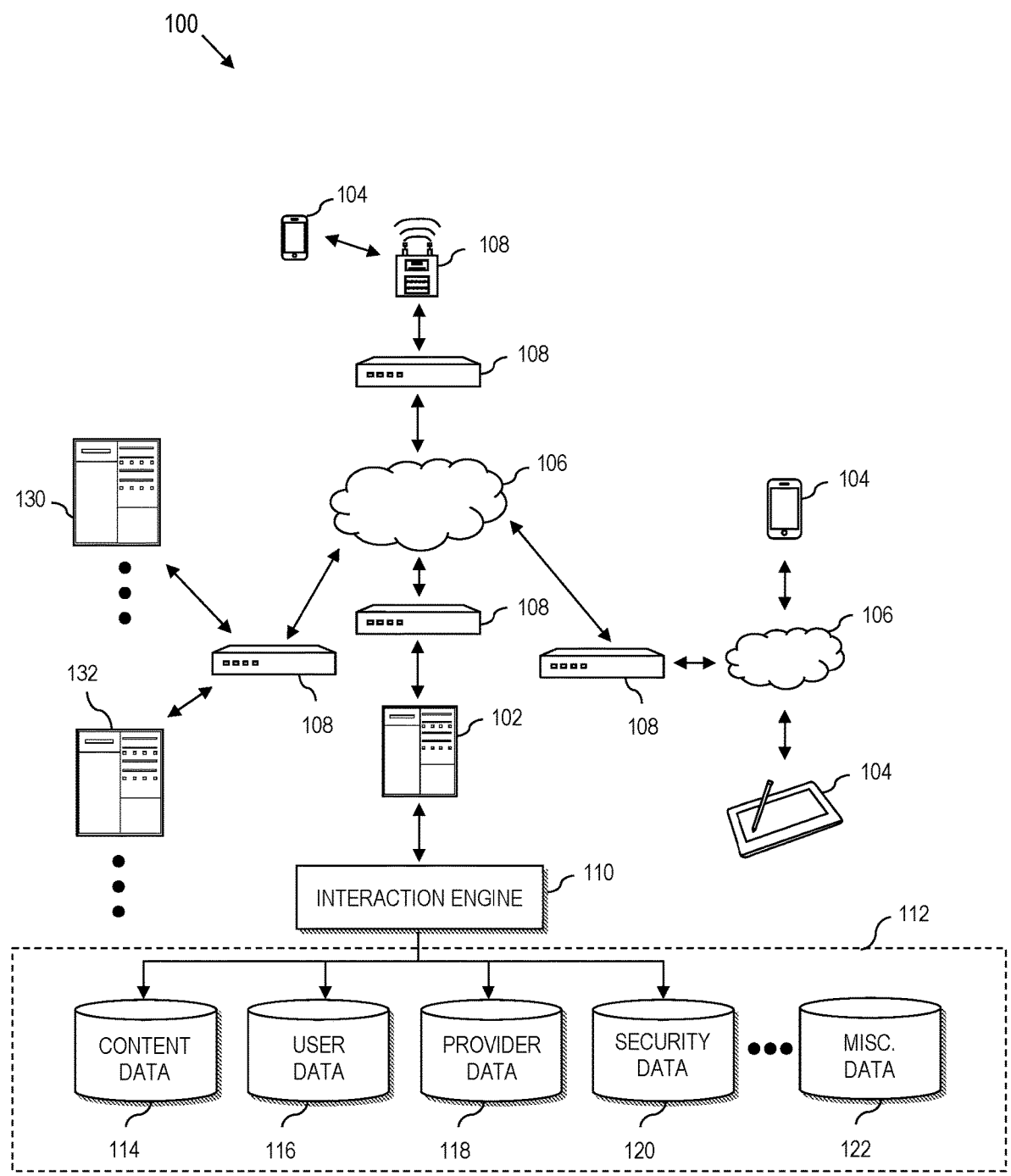
FIG. 1 is a block diagram of an example computer system for tracking on-line digital content consumption according to aspects of the present disclosure herein.

Computer systems are continually used to stream digital content across the internet. In this regard, a server computer is particularly well suited to transmit information. Moreover, a server computer can typically confirm that a remote device received the transmitted information. However, once the remote device receives the information, there is currently no way to automatically determine whether (or determine a likelihood of whether) the digital content is consumed by a user in such a way that the user paid attention to the digital content being delivered.

The present disclosure addresses this issue by utilizing a combination of independent feedback mechanisms to increase the likelihood that a user is paying attention to the content (e.g., a digital block of content) being delivered. In some embodiments, a feedback mechanism comprises detecting a perceptual indicator during playback of the digital content. This detected perceptual indicator can be compared to a perceptual threshold to identify attention. As another example, aspects herein can implement a feedback mechanism implemented as a post block verification. In this example, the post block verification requests a feedback within a prescribed time window (e.g., immediately following the consumption of a block of content), thus presenting a limited time duration to respond. Various metrics related to the feedback can be evaluated to determine a whether a user was paying attention, or was likely to be paying attention to the digital content.

In some embodiments, the block of content may be associated with a content consumption measure. Here, the content consumption measure may be a metric that measures whether the user consumed the content, paid attention during at least a portion of the content, or both. For instance, the content consumption measure may define a duration of a video, a frame range or other content identifier that specifies where in the block of content that attention is to be specifically measured/detected, a location within an image or block of text where a user's attention is desired, etc.

Other examples of verification, validation, feedback, and attention processing are described in greater detail herein.

Some aspects herein consider attention as a form of "currency" or measure. In this regard, the earned or accrued currency of attention can be used to determine compensation back to a user (e.g., in the form of when, what type, how much, combinations thereof, etc.). Here, compensation is not limited to actual money. Rather, compensation can comprise rewards, payment, incentives, access, contribution, and other forms that serve as a reward or attribution.

For instance, according to certain aspects herein, systems and/or processes are provided that act as a "filter" to validate whether or not true attention has taken place responsive to a user encountering digitally communicated content. The output of the filter is used to determine whether the detected attention satisfies a contingency, and thus is worthy of receiving a reward. Here, perception is treated as attention, thus enabling a perceptual indicator to identify whether a user is paying attention to digital content.

Aspects herein can thus measure perceptions (acting as a filter) which produces outcomes. The outcomes can be evaluated against contingencies to determine whether sufficient attention was given to justify a reward, attribution, validation of the user interaction, verification of user interaction, etc.

The process and data of measuring those contingencies can be analyzed and utilized for various workflows and actions. Moreover, the attention invested by users can be measured by their perceptions, thus creating a platform upon which compensation can be attributed to the invested attention.

Example Computer Architecture

Referring to drawings and in particular FIG. 1, a network system 100 is illustrated according to aspects of the present disclosure herein. Generally, a first processing device 102, designated as a first computer, communicates with one or more remote processing devices 104 across a network 106. In this instance, the first processing device 102 is operated by a first entity (e.g., an entity that is carrying out an interaction engine) described more fully herein. Each remote processing device 104 is operated by a second entity (e.g., a digital content consumer).

The first processing device 102 may comprise a mainframe computer, server computer, or other processing device that is capable of carrying out on-line digital content delivery, analysis, data transfer requests, etc., as will be described in greater detail herein. In this regard, the first processing device 102 has access to storage (e.g., any form of storage, including disk(s), network addressed storage (NAS), file server(s), a cloud-based storage or other structure where data can be retrieved).

Each remote processing device 104 can comprise any form of computer processing device that is capable of communicating over the network 106 to request and/or receive data from the first processing device 102. For instance, a typical remote processing device 104 can include another server computer, personal computer, laptop computer, notebook computer, tablet computer, etc. A remote processing device 104 may also comprise by way of example, a transactional system, purpose-driven appliance, cellular device including a smart telephone (hereinafter, "smartphone"), a special purpose computing device such as a smart watch, smart glasses, or other smart/computerized wearable, hand-held device, appliance mounted device, etc.

The network 106 provides communication links between the various processing devices (e.g., the first processing device 102 and the remote processing devices 104). Accordingly, the network 106 may be supported by networking components 108 such as routers, switches, hubs, firewalls, network interfaces, wired or wireless communication links and corresponding interconnections, cellular stations and corresponding cellular conversion technologies (e.g., to convert between cellular and TCP/IP, etc.). Moreover, the network 106 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise (e.g., via time shifting, batch processing, etc.).

The network system 100 is shown by way of illustration, and not by way of limitation, as a computing environment in which various aspects of the present disclosure may be practiced. Other configurations may alternatively be implemented.

For sake of introduction, the interaction engine 110 carries out processing that implements aspects of the present disclosure. In this regard, the processing can be carried out by the interaction engine 110, or by the interaction engine 110 in cooperation with program code implemented in on a remote processing device 104. In this regard, the interaction engine may interact with one or more data sources 112, such as a digital content data source 114, a user data source 116, a digital content provider data source 118, a security data source 120, miscellaneous data source(s) 122, etc.

FIG. 1 further illustrates an optional provider processing device 130, which is operated by a third entity, typically a digital content provider or digital content producer. The provider processing device 130 can comprise any of the computing devices described above with reference to either the first processing device 102 or remote processing device 104. In an example implementation, the provider processing device 130 can comprise a server computer that is operated by a company desiring to stream digital content or otherwise make digital content available for consumption. Moreover, in practical applications, there can be multiple provider processing devices 130.

Yet further, FIG. 1 illustrates an optional third party processing device 132. The third party processing device 132 can comprise any of the computing devices described above with reference to either the first processing device 102 or remote processing device 104. In an example implementation, the third party processing device 132 can comprise a server computer that is operated by a fourth entity (e.g., a party of interest in a transaction between a user operating a remote processing device 104) and a provider processing device 130 (e.g., the third party processing device 132 can be operated by a bank, rewards center, or any third party that will deliver to a user of a remote processing device 104, a benefit (e.g., payment, coupon, voucher, discount, or other compensation, certificate, credit, diploma, accreditation, attribution, or other exchange) for consuming digital content from a digital content processing device 130. In practical applications, there can be multiple third party processing devices 132.

Example Data

Figure 2:
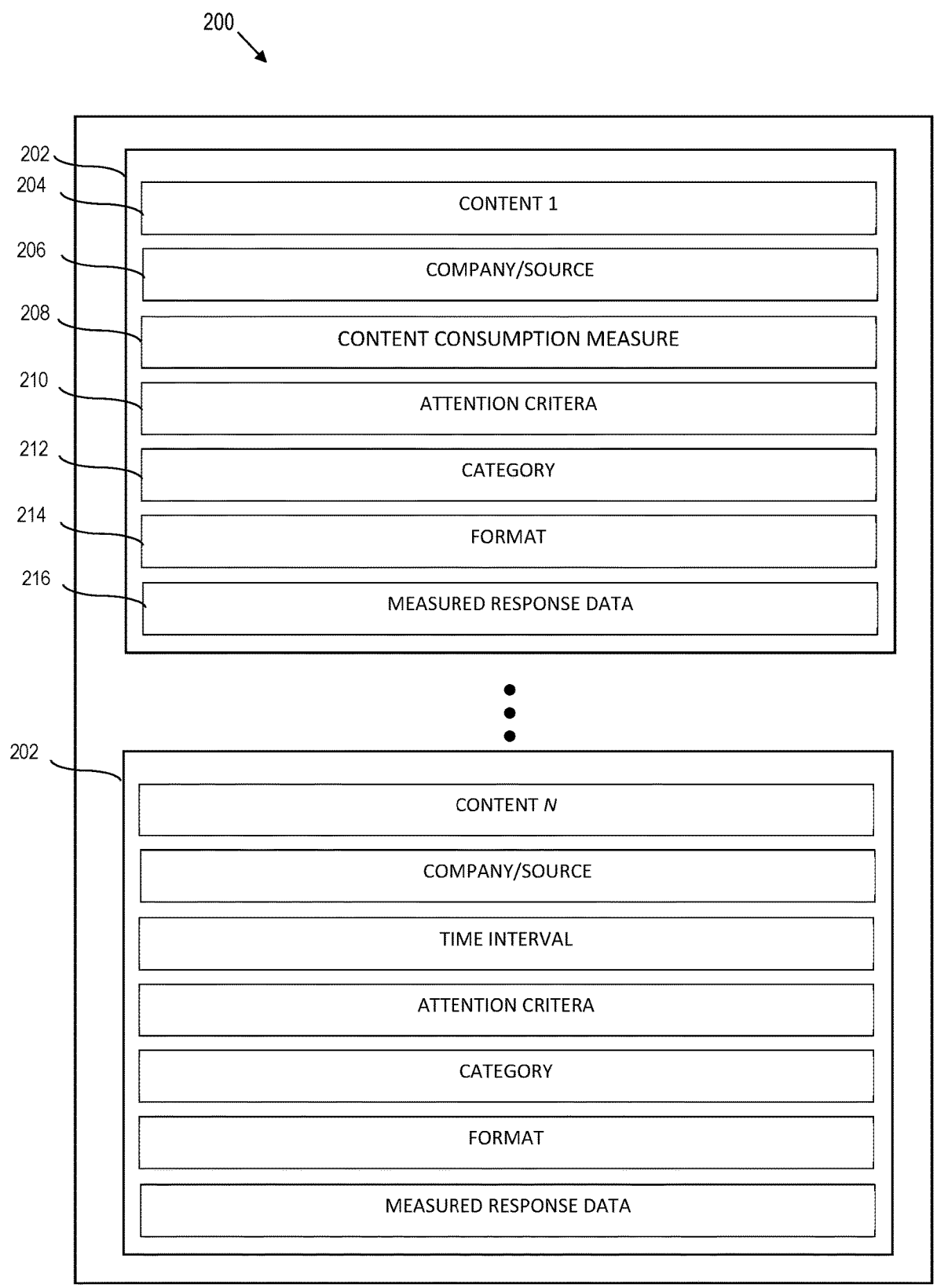
FIG. 2 is a block diagram of example content data.

Referring now to FIG. 2, an example of digital content data 200 (e.g., digital content data that can be stored in the digital content data 114 (FIG. 1)), is illustrated.

Example digital content data 200 is illustrated solely for purposes of clarity of discussion, as a set of records 202. Here, each identified field should be considered optional, and presented by way of illustration and not by way of limitation. Each record 202 can include digital content 204. Example digital content can be audio, video, image data, digital text, augmented reality data, virtual reality data, links to digital content stored on a remote site, etc. That is, the digital content 202 is any digital content intended to be consumed, and which can be conveyed via a user's remote processing device 104 (FIG. 1).

Each record 202 can also store data identifying a company/source 206. The company/source 206 is typically the digital content provider (which is not necessarily the content host). For example, a company commercial or advertisement can be hosted on third party public platforms, streaming services, websites, etc. The source 206 can also be an accreditation source, school, training center, etc., that requires a user to obtain training, education, etc.

A "content consumption measure" 208 is a measure of attention, e.g., a measure of attention associated with a block of content such as the content 204. Typically, the content consumption measure is collected while a user is actively consuming the content, e.g., content 204.

By way of example, a content consumption measure 208 can comprise an "attention interval" variable that is utilized as a measure of attention. For instance, if the user is required to pay attention for 10 seconds, then the attention interval data 208 can be set to 10 seconds. An attention interval can be measured in time (e.g., a running length of time that the user must pay attention), an interval (e.g., the system tests for attention of the user at the prescribed interval), a number of positive attention measures, or any other suitable means to measure and/or evaluate attention of the user. The content consumption measure 208 can also identify a level of attention, a particular reference within the content 204 where attention is required, frames within a video form of the digital content where attention is required, ranges of attention across the content 204, a duration of the content 204 or a minimum amount of time that attention must be detected, any combination of the above, etc.

The attention criteria 210 define one or more rules that evaluate whether a user associated with digital content delivered to an associated remote processing device has paid enough suitable attention to satisfy a corresponding requirement, e.g., as defined by the content consumption measure. The attention criteria 210 can define a threshold, rule, set of rules, statistical evaluation, inferential evaluation, or any other measure, and will depend upon the specific application. By way of example, the attention criteria can store a perception threshold, which defines when an acceptable consumption and/or attention requirement is satisfied, e.g., as measured by a perception indicator. Here, the attention criteria 210 may define how to collect the perception indicator, or the perception indicator may be defined using other means.

In some embodiments, the attention criteria 210 can also define a post block verification measure. A post block verification measure can serve as a check against the perception indictor, or can even serve as an alternative to the perception indicator. As an example, the post block verification measure can set a duration to provide feedback, e.g., via a polling question or questions, providing feedback, etc. The post block verification measure can also require the user to take an action, e.g., select an icon, press a button or control, enter a designated response, etc.

The category data 212 defines example content classifications. While not strictly required, having categories enables the system (e.g., via the interaction engine 110, FIG. 1) to set up digital content for users that is likely to be of interest to the user when the user consumes the digital content.

The format data 214 is the type of data that the digital content is in. For example, the digital content may include different formats, where each format satisfies compatibility restrictions on various user devices.

The system can also store response data 216, i.e., the response of the user to the digital content. For instance, as the content is presented to the user, feedback can be collected, aggregated and stored for later analysis.

User Data

Figure 3:
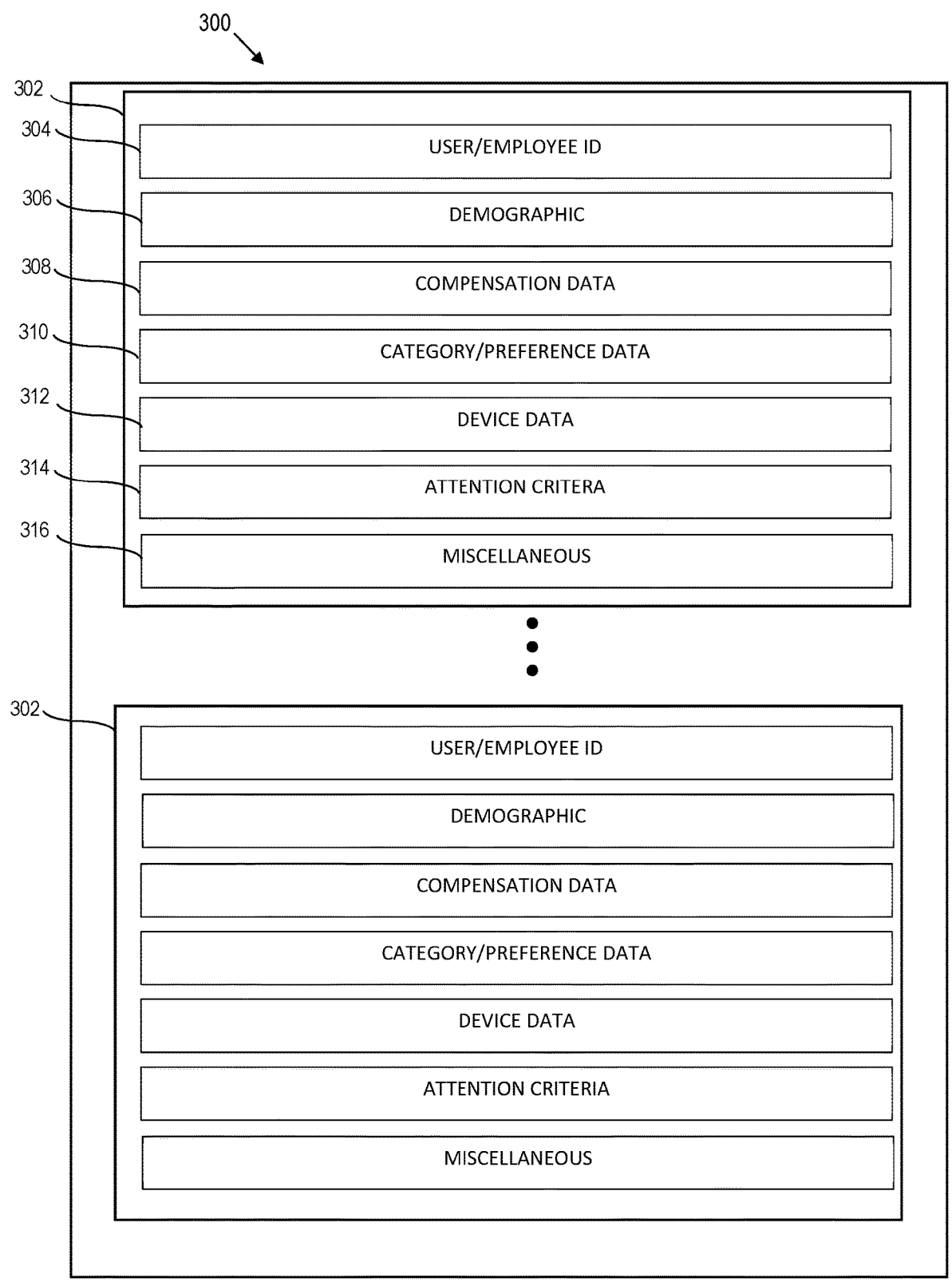
FIG. 3 is a block diagram of example user data.

Referring now to FIG. 3, an example of user data 300 (e.g., user data that can be stored in the user data 116 (FIG. 1)), is illustrated.

Example user data 300 is illustrated solely for purposes of clarity of discussion, as a set of records 302. Here, each identified field should be considered optional, and presented by way of illustration and not by way of limitation.

Each record 302 can include user/employee identity (USER ID) 304.

The user data record 302 can also store demographic information 306 about the user.

The user data record 302 can also store compensation data 308 that is pertinent to the user. The compensation data 308 can include preferred bank, bank accounts/bank access information, etc. This enables automatic payment to be dispersed to the user or other transactions to be carried out upon the user satisfying conditions required to receive compensation.

Yet further, the user data record 302 can store category/preference data 310. This allows the system (e.g., the interaction engine 110, FIG. 1), to match up digital content (e.g., in a digital content record 202 (FIG. 2)) with a user associated with a corresponding user data record 302 (e.g., by matching records having similar data stored in the category 310 (FIG. 3) to records having related data stored in the category 212 (FIG. 2)).

The user data record 302 also includes device data 312 (e.g., information about the user's preference for receiving digital content). For instance, the user may set up a smartphone, a tablet, and a laptop computer. Each type of device may receive different digital content, or similar digital content formatted appropriately for the intended device.

The user data record 302 can also include attention criteria 314. This is optional and tracks attention requirements from the user perspective.

The user data record 302 can also include miscellaneous data 316. This is optional and can be used to store any data required by the system.

Content Provider Data

Figure 4:
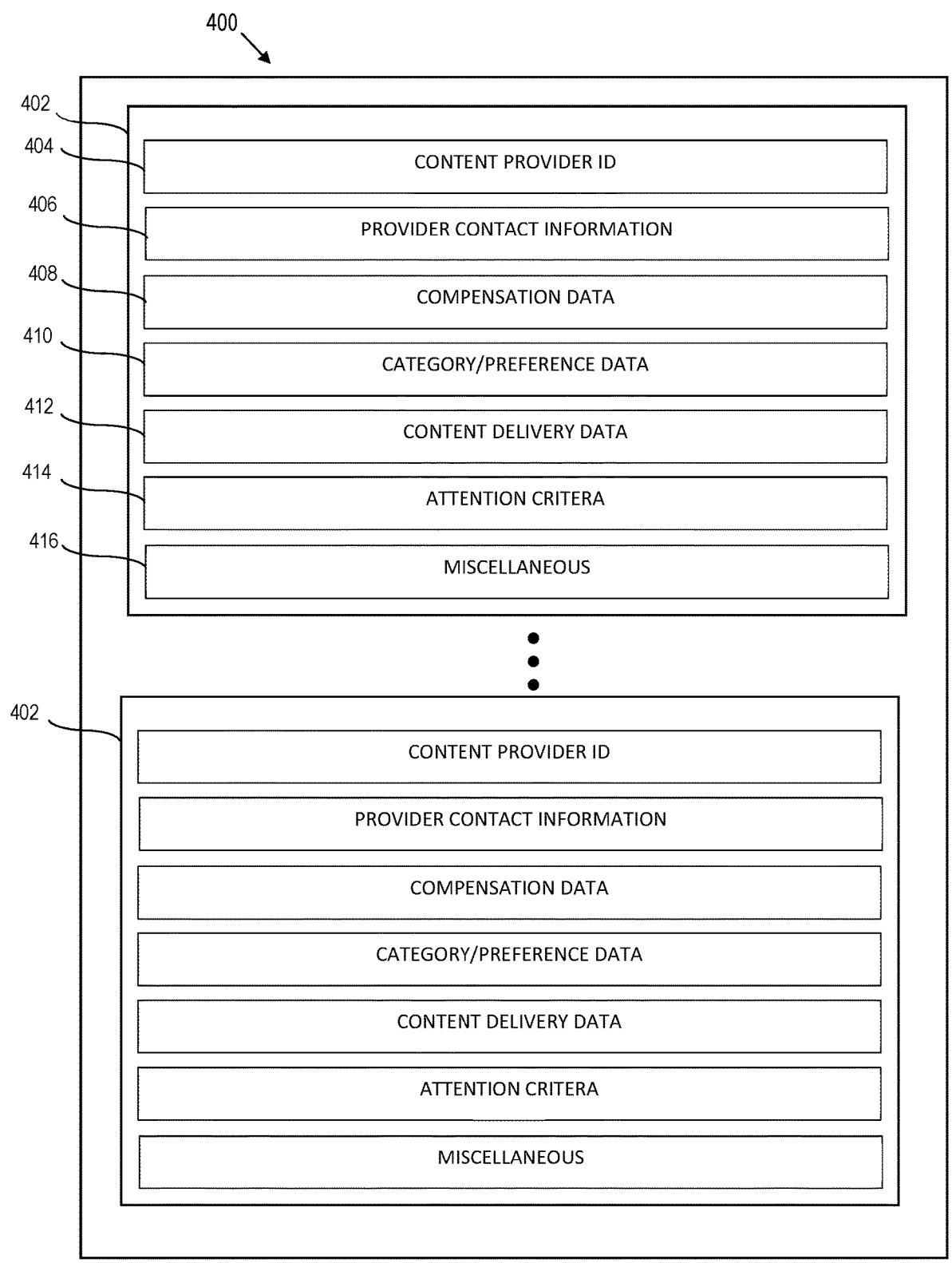
FIG. 4 is a block diagram of example provider data.

Referring now to FIG. 4, an example of content provider data 400 (e.g., content provider data that can be stored in the content provider data 118 (FIG. 1)), is illustrated.

Example content provider data 400 is illustrated solely for purposes of clarity of discussion, as a set of records 402. Here, each identified field should be considered optional, and presented by way of illustration and not by way of limitation.

Each record 402 can include a content provider identity (PROVIDER ID) 404.

The content provider data record 402 can also store provider contact information 406, which can include relevant address, contact, and other information about the content provider (e.g., a company).

The content provider data record 402 can also store compensation data 408 that is pertinent to the content provider. The compensation data 408 can include preferred bank, bank accounts/bank access information, etc. The compensation data 408 can also include payout information, such as an amount the content provider is willing to pay in order for the user to consume the content, etc.

Yet further, the content provider data record 402 can store category/preference data 410. This allows the system (e.g., the interaction engine 110, FIG. 1), to match up digital content (e.g., in a content record 202 (FIG. 2)) with a content provider associated with a corresponding content provider data record 402.

The content provider data record 402 also includes content delivery data 412 (e.g., how many times a month the digital content is to be delivered/streamed, device platform preference, demographic preference, how many times a single user can stream the digital content, etc.).

The content provider data record 402 can also include attention criteria 414. This is optional and tracks attention requirements from the content provider perspective. In this regard, the attention criteria 414 can be similar to the attention criteria 212 (FIG. 2). As an additional example, the content provider may require audio to be above a threshold for X % of the total play time, during certain intervals of play time, for the entire playback, etc., of the delivered digital content. Basically, any rule can be created that defines the metrics for satisfying an attention requirement triggering payout.

The content provider data record 402 can also include miscellaneous data 416. This is optional and can be used to store any data required by the system.

Example Application—Attention Triggered Event Processing

Figure 5:
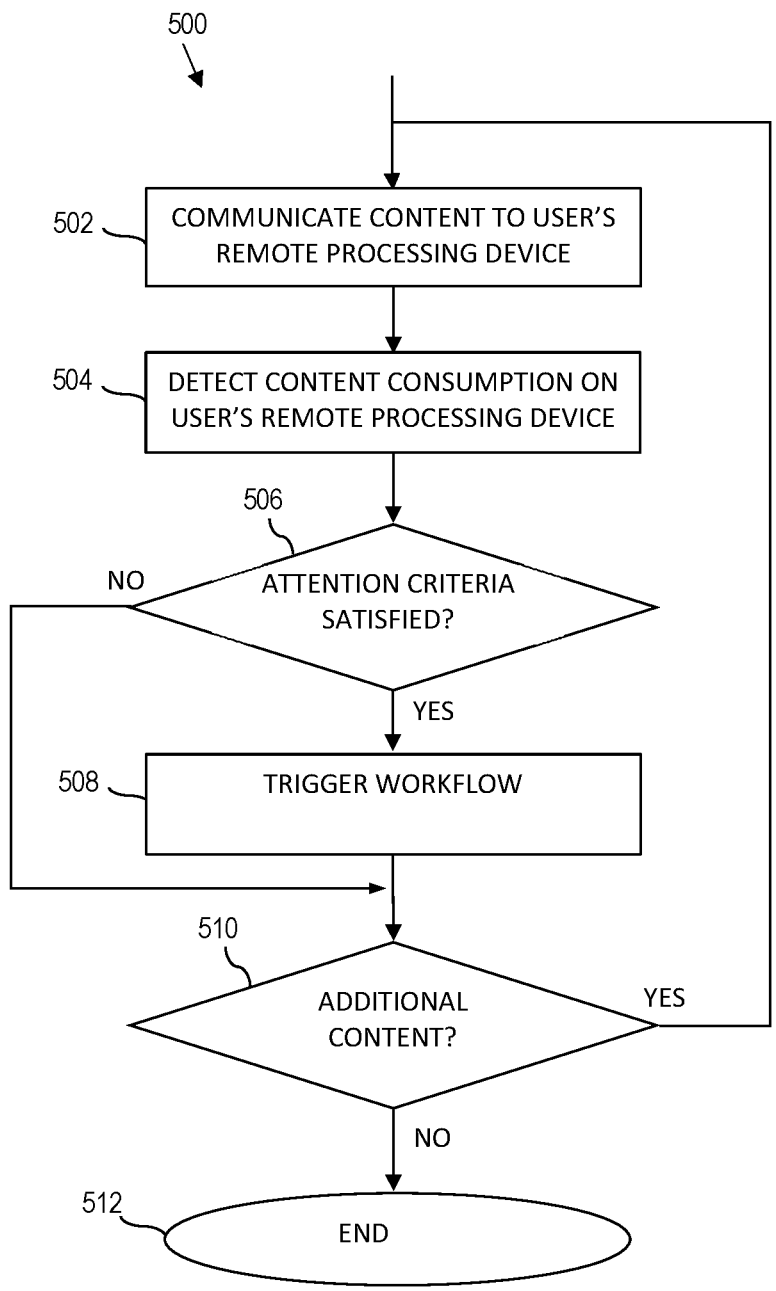
FIG. 5 is a flow chart illustrating a method of tracking attention and/or for tracking consumption of content.

Referring to FIG. 5, an example flow chart illustrates an example method 500 of detecting a user's attention when consuming digital content. The method 500 can be carried out for instance, by the interaction engine 110 (FIG. 1) interacting with a remote processing device 104 (FIG. 1). Moreover, the method 500 may be implemented by a processor of a computer carrying out code read out from memory to implement the described method. Here, the computer code can optionally utilize the example data structures of FIG. 2-FIG. 4, to carry out content delivery according to aspects herein.

At 502, the method communicates a block of digital content (e.g., digital content in a deliverable form) to a remote processing device (e.g., associated with a user). In practical applications, this can be accomplished in a number of different ways.

For instance, with brief reference back to FIG. 1, the interaction engine 110 can access digital content (e.g., from the content data 114). The interaction engine 110 can also identify one or more users (e.g., by extracting user information from the user data 116). The interaction engine may also interact with content provider data in the content provider data 118 to identify a desired device platform, delivery data, etc.

In some example applications, the interaction engine 110 selects digital content and uses the first processing device 102 as a streaming engine to stream the digital content to a remote processing device 104 that is operated by a corresponding targeted user. In this example, the remote processing device 104 may use a standard browser, or the remote processing device 104 may utilize a program specially loaded onto the device (e.g., from an app store, for receiving the content). The block of digital content need not be streamed as long as the digital content is delivered electronically, e.g., over the Internet, via cellular, etc.

In another example embodiment, a user interacting with a remote processing device 104 logs into the first processing device 102 (e.g., via the Internet). For instance, the interaction engine may communicate a graphical user interface screen back to the remote processing device that prompts the user to log in using a registered name and password.

The first processing device 102 couples the remote processing device 104 to the interaction engine 110. Here, the user may be presented with a number of options (e.g., via a graphical user interface (GUI)) to select content from the available content providers and/or to select content. Upon completion of content consumption (e.g., playback), the user may be able to manually select a next content item, or the interaction engine 110 can automatically select a next content item to deliver to the user. Referring now back to FIG. 5.

In yet further embodiments, the interaction engine 110 identifies a content server 130 (e.g., a public content service that is actively hosting the content).

At 504, the method detects content consumption on the user's remote processing device. For instance, the user plays back the delivered content on the remote processing device, accesses the content, displays the content on a display screen of the remote processing device, etc. For instance, the user, operating a remote processing device such as a smart phone, tablet, smart appliance, laptop, desktop, etc., can view/interact with the content, such as to play a video, play the content of an audio file, display content in text form (e.g., to read the content), view an image, combinations thereof, etc.

At 506, a determination is made as to whether attention criteria is satisfied. The attention criteria can be predefined. In some embodiments, the attention criteria can be customized (e.g., based upon the user, remote processing device, content provider preferences, content type, content itself, combinations thereof, etc.).

Notably, as used herein, "criteria" is intended to be considered broadly and includes the singular "criterion" within the meaning of "criteria".

In an example configuration, the attention criteria is defined as a perception indicator. Here, the method 500 at 504 and/or 506 electronically detects a perception indicator of an end user interacting with the block of content on the remote processing device, where the perception indicator corresponds to a detection of attention paid by the end user to the block of content.

Here, the method can generate a contingency result, where the contingency result is based upon a comparison of the perception indicator to a perception threshold. The perception threshold can define the minimum attention required to satisfy the attention criteria.

In an example configuration, the attention criteria is defined as a perception indicator, such as an auditory threshold function. For instance, the remote processing device 104 can include program code thereon to determine an audio parameter, which can include the processor of the remote processing device reading a volume control setting, ensuring there is no mute function, combinations thereof, etc. In a more advanced implementation, the program code on the remote control device 104 can evaluate a signal level of the audio associated with the delivered content. Here, the signal level (or an averaged audio signal level) is compared with the position of the volume control to estimate an output volume level estimated to be played out a speaker. In yet other embodiments, the system can distinguish between playback over earbuds, headphones, or a device built-in speaker, and adjust the threshold accordingly.

Regardless, in some embodiments, the system (e.g., the phone application, interaction server, combination thereof, etc.) confirms that the attention criteria is satisfied, e.g., the detection of volume at a specific threshold. Here, the perception threshold can be set at a specific value, e.g., volume control turned up to at least 50 percent, and mute off. The perception threshold can take alternative forms as well, such as determining whether a smartphone is playing back audio through connected speakers, earbuds, or built-in speakers, where a perception threshold can be dynamically set based upon the output source, settings, environment, a combination thereof, etc.

In yet another example, the program code on the remote processing device communicates parameters to the interaction engine 110 (e.g., volume control setting, etc.). The interaction engine 110 can then evaluate whether the attention criteria (e.g., auditory threshold function) is satisfied based upon an established perception threshold.

In some embodiments, the established perception threshold can be used to identify the particular measures required by the perception indicator. Moreover, the attention criteria can be used as a basis to establish the perception threshold and hence the perception indicator. As an illustration, assume the attention criteria is directed to hearing a message played back as audio. A perception threshold can be set at a minimum of 75% volume setting for the duration of the message. Thus, the perception indicator can be established by identifying the playback of the message, and detecting the speaker volume setting during the playback of the message. A similar process can be carried out for video, images, text, etc., where an established perception threshold can be used as the basis to identify how to measure the perception indicator.

At 508, the method optionally triggers a workflow. As an example, the method can send a communication to at least one of the remote processing device or a remote server associated with the block of content, where the communication comprises an indicator of the contingency result. As another example, the method can automate delivery of compensation, reward, attribution, etc., to the user if the determination at 506 indicates that the attention criteria is satisfied. Keeping with the examples provided with regard to the attention criteria at 506, if the auditory threshold function is satisfied, the system can enable a payment to the user. Thus, it can be seen that payment is made in exchange for the user's attention. For instance, the interaction server 110 can identify bank information from the user data 116 and initiate a payment via a trusted third party 132 (e.g., a bank).

At 510, a decision is made as to whether to deliver additional content.

At 512, the process ends, where the decision at 510 determines that no additional content is desired or otherwise required. Otherwise, the process loops back to 502 and repeats.

The method 500 can optionally include other processing actions as well. For instance, the method can assemble the digital block of content for electronic transmission to a remote processing device, where the block of content has a content consumption measure. The method 500 can also optionally monitor the end user's interaction with the block of digital content to determine whether the content consumption measure was satisfied. In this regard, the method generates the contingency result further comprises basing the contingency result upon the comparison of the perception indicator to the perception threshold, and based upon the determination of whether the content consumption measure was satisfied.

The method can also associate a post block verification measure to the block of content, and monitor the end user's interaction with the remote processing device after consuming the block of digital content to determine whether the post block verification measure was satisfied. In this regard, the method can generate the contingency result by basing the contingency result upon the comparison of the perception indicator to the perception threshold, based upon the determination of whether the content consumption measure was satisfied, and based upon the determination of whether the post block verification measure was satisfied. The process can also generate the contingency result further comprises basing the contingency result upon the comparison of the perception indicator to the perception threshold, and based upon the determination of whether the post block verification measure was satisfied.

Tracking Consumption of Online Content

Figure 6:
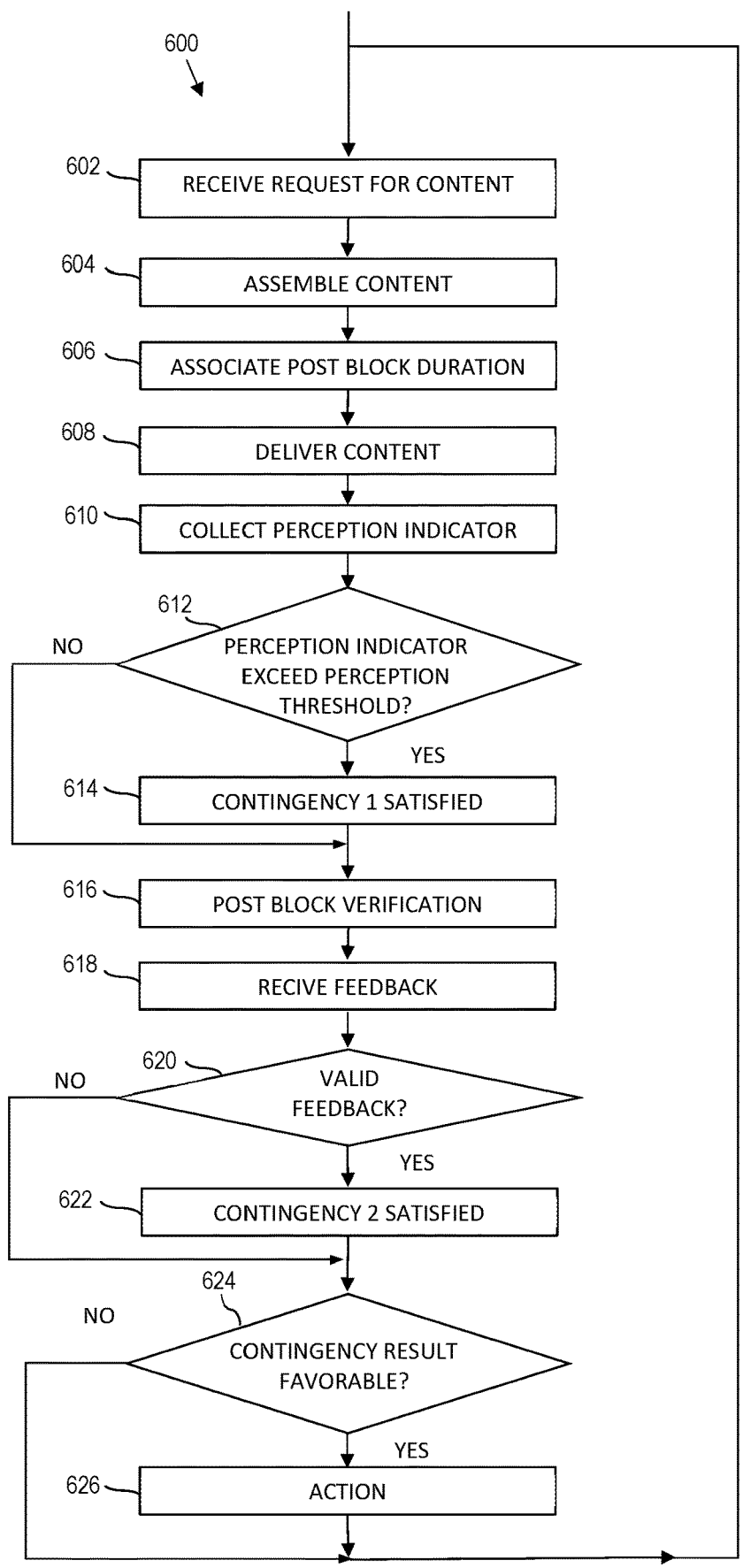
FIG. 6 is a flow chart illustrating a method of tracking attention and/or for tracking consumption of content.

Referring to FIG. 6, a method 600 of tracking a user's consumption of digital (e.g., online) content is provided, according to further aspects of the present disclosure. The method 600 can be carried out for instance, by the interaction engine 110 (FIG. 1) interacting with a remote processing device 104 (FIG. 1). Moreover, the method 600 may be implemented by a processor of a computer carrying out code read out from memory to implement the described method. Here, the computer code can optionally utilize the example data structures of FIG. 2-FIG. 4, to carry out content delivery according to aspects herein.

The method 600 comprises communicating a block of content to a remote processing device. For instance, the block of content can optionally be communicated by receiving at 602, a request from a remote processing device to begin receiving content. In some embodiments, receiving at 602 comprises receiving the request responsive to a user interacting with the remote processing device and logging onto a content platform. For instance, a user may launch an app on a remote processing device 104 (FIG. 1) or open a web browser and navigate to a specific URL, where the user can log into the interaction engine 110 (FIG. 1) such as a content platform and requests content.

In an example embodiment, the method 600 communicates a block of content to a remote processing device for playback thereon, where the block of content has a known content playback duration, and the block of content also has associated therewith, a post block verification duration.

Referring back to FIG. 6, the method 600 optionally comprises assembling at 604, a block of content based upon the received request. For instance, assembling at 604 can comprise assembling the block of content as a set of video content items, audio items, combinations thereof, images, text, questions, a survey, etc. The assembly at 604 may be optional, such as where the block of content is already created.

Here, the block of content has a known content playback duration. The block of content can be a single content item, a collection of content items, a uniquely curated set of content items, etc.

Assembling at 604 can also comprise assembling the block of content as a set of video content items, where each content item is associated with a predefined category of content; assembling the block of content as a set of video content items, each content item having the same duration of playback; assembling the block of content as a set of video content items, each content item not having the same duration of playback, combinations thereof, etc. For instance, a block of content can be assembled from content items sharing a common category, a set of content items extracted for having a common/generic category etc.

The method 600 can also optionally comprise associating at 606, a post block verification measure (e.g., a post block verification duration) to the block of content, such as where a post block verification measure has not already been determined. By way of example, if a goal is to provide three minutes to complete a cycle of content, the method may curate a block of content comprising for example, 11 fifteen second content items, played back to back in a sequence. Thus, the total run time for playback would be 165 seconds, which would leave 15 seconds following the playback for a post block verification. Thus, the post block verification is assigned to 15 seconds.

The method 600 also comprises delivering at 608, the assembled block of content to the remote processing device for playback thereon.

Additionally, the method 600 comprises collecting at 610, during consumption of the block of content (e.g., playback of the block of content) on the remote processing device, a perception indicator. As noted more fully herein, the perception indicator designates that attention is being paid, that characterizes an inference that can be drawn that attention is being paid, that characterizes a likelihood that attention is being paid, or a combination of the above.

The method 600 also comprises comparing at 612, the collected perception indicator against a perception threshold. If the comparison is satisfied (612 is YES) then the method considers at 614, the first contingency as being satisfied. If the comparison is unfavorable (612 is NO) then the first contingency is not satisfied.

As a few examples, the perception indicator may be a volume position. For instance, the perception indicator may be tied to an auditory measure. Here, the perception indicator may be tied to a setting of the volume control. The perception threshold may correspondingly be a minimum volume control setting. This creates a likelihood that the audio is played back at a sufficient volume to be heard by the user. In other examples, auditory indicator may be volume settings checked at discrete times during playback, the volume setting can be monitored during the entire playback, etc.

In other examples, the perception indicator may be a measured level (e.g., measured decibel (dB) level of audio from the playback of the content), and the perception threshold may be a minimum measurement in decibels (dB).

In other examples, the perception indicator can be a gaze detection, stare detection, a measure of screen brightness, an action of the user in response to a queue, such as to engage a control, follow a command, etc. Other examples are described in analogous fashion with regard to FIG. 5 herein, and those examples are incorporated by reference into this example embodiment. Notably, the corresponding perception threshold would be established in accordance with the associated perception indicator. Thus, if gaze is the perception indicator, as non-limiting examples, the associated perception threshold may be to have eyes on the display screen for a predetermined period of time, to detect the user gazed at a specific portion of the display, to verify that the user's gaze followed key indicators in a video segment, that the gaze towards the screen lasted a predetermined minimum amount of consecutive time, combinations thereof, etc. Here, the system can adjust the perception threshold based upon a desired level of attention desired for the specific application.

As an additional example, if a perception indicator is tied to vision or gaze, the method may comprise collecting, during playback of the block of content on the remote processing device, a perception indicator, by performing (e.g., once, at discrete times, or throughout the entirety of playback of the block of content) an action such as to enable a camera on the remote processing device, enable a gaze detection device, etc. Here, comparing the collected perception indicator against a perception threshold can comprise capturing an image (or images) of a user of the remote processing device and applying a facial evaluation algorithm that verifies whether the user's eyes are directed towards a display screen of the remote processing device that is playing back the block of content, that the user's eyes are directed to a correct portion of a display area in a graphical user interface, etc.

The method 600 yet further comprises performing at 616, a post block verification. The post block verification can optionally begin immediately after the consumption/playback of the block of content and can last up to the post block verification duration, or other wise until the post block verification measure is collected or otherwise expires. As described with reference to FIG. 5, the post block verification may comprise presenting on the display screen of the remote processing device, a question, a selection, or other opportunity for a user to provide feedback. Feedback may be a correct response, an incorrect or invalid response, or no response at all.

The method 600 comprises receiving at 618, feedback during the post block verification process. For instance, the method may comprise performing a post block verification by presenting on a display screen of the remote processing device, a set of options pertaining to the block of content, and prompting a user of the remote processing device to answer a question about the block of content. Here, receiving feedback during the post block verification process may comprise reading whether the user provides feedback by pressing a graphical input presented on the display screen. In this example, the feedback must be recorded within the post block verification duration.

The method additionally comprises determining at 620 whether the feedback is valid, and if the feedback is valid, determining that a second contingency is satisfied at 622.

The method further comprises determining, at 624, a contingency result. The contingency result is based upon the comparison of the perception indicator to the perception threshold (e.g., the result of the first contingency evaluation), and the received feedback (e.g., the result of the second contingency evaluation).

If the contingency result is favorable, an optional action is taken at 626 (e.g., the user gets credit for completing the cycle, the user gets paid for watching the cycle, etc.). The method can then optionally stop, or loop back and the cycle can repeat.

Thus, the method 600 can operate once, or as a cycle of loops. Each cycle may automatically start immediately following the post block verification duration. Moreover, in this example, at least two, independent verifications of attention are collected, at two different times, a perception indicator during playback of the content, and a user feedback during the post block verification duration.

Loop Example

In an illustrative example, user's are presented advertisements, and the user's attention to the advertisement is required to trigger a reward.

In an example configuration, advertisements are run on a loop. For instance, the interaction engine 110 (FIG. 1) orchestrates obtaining and placing advertising material (such as videos) in a loop. In an example configuration, ad space is sold or otherwise bundled as "15 second" sections of a cycle. Here, a number of sections (e.g., twelve 15 second sections are played), or 180 seconds worth of content in an example configuration. In some embodiments, the loop can be split up into 1, 2, or multiple pieces, where each segment is preferably allowed to be bought in succession.

After the loop of content (e.g., 180 seconds of content in the above example), an optional window can be provided to collect feedback from the user. Alternatively, one or more periods of the loop can be used to collect feedback. For instance, the first 11 fifteen second content items can be played back, reserving the $12^{th}$ segment of the loop for feedback. For instance, there can be a predetermined time window (e.g., a 15 second window), prompting the user to provide feedback (e.g., via selection of choices). In an example embodiment, there are eleven choices (e.g., the eleven choices corresponding to the previous content providers), such as companies logo/name/etc., prompting the user to answer questions such as, "Which advertisement did you enjoy the most?", "Of the previous advertisements, which would you most prefer to do business with?" etc.

Contingencies

In an example embodiment, in order to be paid, receive credit, etc., for a completed loop (e.g., the previous 180 seconds of advertisement time), the user may be required to demonstrate that an appropriate level of attention is paid, optionally at the correct time/location/duration, etc. Thus, there is a "contingency" to obtaining a reward. The contingency may require the user, for example, to provide feedback (e.g., answer one or more questions), click on a preferred answer from a set of options, answer a polling question, or otherwise provide feedback based upon the content items presented in the current loop. Because this is a loop, the user may have a time limited period to respond (e.g., the user may be required to click any choice during the 15 second question slot of the cycle) (which may always be the 12th and final section). Additionally, the volume must be above a specific threshold. If the two contingencies are met in this non-limiting example, the user will be paid for the attention given for the previous 3 minutes.

Example User's Graphical User Interface

Figure 7:
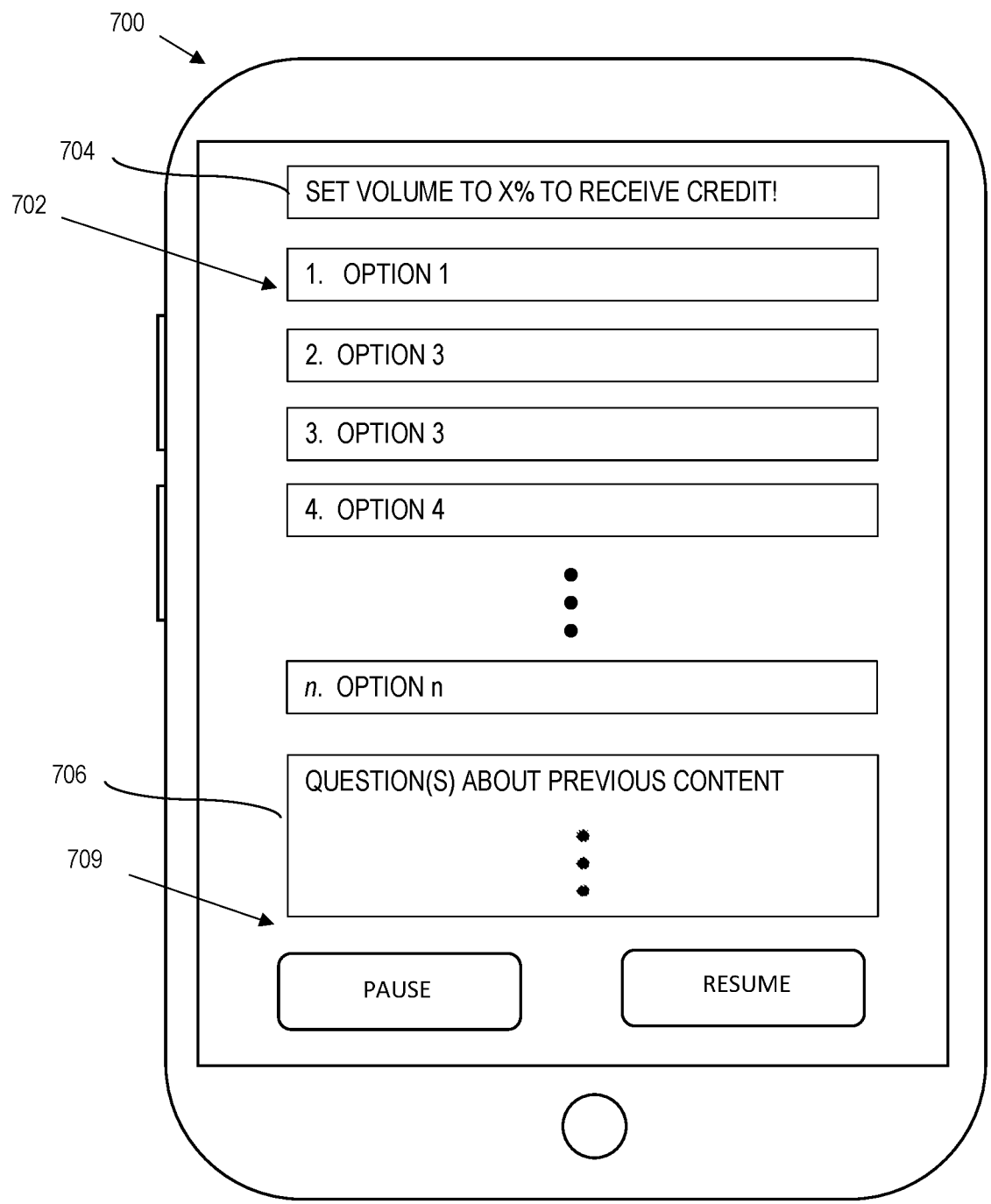
FIG. 7 is a block diagram of an example graphical user interface of a user.

Referring to FIG. 7, an example screen shot/graphical user interface illustrates aspects of various embodiments herein from the end user perspective.

As noted more fully herein, methods are provided for detecting a user's attention when consuming digital content. A server computer, e.g., the an interaction engine 110 (FIG. 1) electronically communicates a block of content to a remote processing device. The block of content can be displayed, played back, presented, or otherwise enabled on the remote processing device of the user. The block of content is illustrated at 702. For sake of example, the block of content is illustrated as messaging that includes a set of options for the user to consider. Here, selecting an option triggers the playback of a digital file, e.g., audio, video, etc. In practice, the block of content can include audio, video, text, graphics, images, other content, combinations thereof, etc.

The method also electronically detects a perception indicator of a user interacting with the block of content on the remote processing device, where the perception indicator corresponds to a detection of attention paid by the user to the block of content on the remote processing device. In the illustrated example, the graphical user interface 700 informs the user of the attention criteria to satisfy the perception indicator at 704. For instance, the graphical user interface at 704 instructs the user to set the volume of playback to X %, such as 75% minimum, to receive credit. Such an instruction is not required, but is helpful to establish clear compliance requirements. In some embodiments, such as where a consumption measure is set, the user may be required for example, to maintain the volume at the specified level for the duration of the entire playback. Thus, computer code on the user processing device, on the server, or a combination thereof, perform the computer processing necessary to verify/validate the perception indicator. The method also generates a contingency result based upon a comparison of the perception indicator to a perception threshold and sends a communication to at least one of the remote processing device or a remote server associated with the block of content, providing an indicator of the contingency result.

As noted above, in some embodiments, the method associates a post block verification measure to the block of content, and monitors the user's interaction with the remote processing device after consuming the block of digital content to determine whether the post block verification measure was satisfied. For example, as illustrated, the graphical user interface 700 presents a polling question at 706, which can serve as a validation, verification, or both, of the user's attention to the block of digital content.

Loop Example

Referring back to the loop example, the graphical user interface 700 can present the user with options regarding the content items provided within the current loop, and ask at least one question. Notably, this example also provides indicia, i.e., a message (SET VOLUME TO X % TO RECEIVE CREDIT!) where X corresponds to the threshold.

In some embodiments, the threshold must be satisfied, i.e., volume above the threshold for the entirety of the loop. In other embodiments, a rules engine can provide exceptions (e.g., cannot fall below the threshold for more than 3 seconds for the duration of the entire loop to account for outliers).

Moreover, in some embodiments, the graphical user interface 700 can include one or more controls 708. For instance, the controls 708 may include a "pause" function and "resume" function (e.g., where interaction with the content items must be interrupted), such as to take a telephone call, answer a text message, mute the volume for another purpose, etc.

Alternative/Additional Attention Measure

Many remote processing devices 104 (FIG. 1) (e.g., smart phones, tablets, laptops, etc.), have a camera. As such, facial recognition can be utilized, that ensures the user's eyes are on the screen during the loop.

In some embodiments, a tiered system of auditory percentages can be set up that register at different costs, different payouts, combinations thereof, etc. For instance, in the example of advertisements, more expensive 15 second ads would be allowed to have a louder format requirement (higher auditory threshold requirement) than any others. As another example, in a medical application or educational application, the critical nature of the content could be tiered so that the most critical information requires relatively higher thresholds, etc. This allows the threshold to be dynamic, based upon the individual content item. This dynamic thresholding can also be based upon the end user or even an environmental factor, e.g., where the user is located, what remote computing device the user is accessing, etc.

In some embodiments, such as where the end user is attempting to gain a reward, the user may be able to scale how much they want to earn by adjusting the threshold up or down based upon a predetermined minimum and maximum range. Thus, in some embodiments, the user may be able to influence the perceptual thresholds, post block content measure requirements, etc.

In some embodiments, there are more specific categories to choose from. Moreover, a content producer can select the demographics, categories, or other parameters that affect selection of their content, thus increasing a higher likelihood of relevant communication.

In some embodiments, a shopping cart icon can be provided on the remote processing device graphical user interface 700 (e.g., in the top corner of the screen), allowing someone to place a specific ad in the shopping cart for later. As another example, the graphical user interface 700 can display to the user, products on a payment redemption screen and allow the user to purchase such displayed products on the spot.

Questions

The polling question at 706 can prompt the user, via the graphical user interface, to answer one or more questions, provide a feedback, solicit specific information such as a correct question about the content, etc. To keep users from memorizing answers, the questions can be randomized, and at certain intervals, the user may be required to enter or otherwise key in information to ensure that they are still paying attention. By way of example, every two hours of use, the system may ensure the user is still present by prompting a question that either requires a typed answer or the user may be required to press or otherwise engage a specific control, e.g., press a physical button, press a virtual control on the graphical user interface, enter a correct code that is provided to the user, etc.

Coupon

In still further embodiments, the system can provide a coupon feature. Users have opportunities to collect coupons to companies by providing attention via consuming company content. The user may also be required to provide additional information, such as insights, reviews, feedback, etc. Coupons can be collected and cataloged in the user database, e.g., user data 116 (FIG. 1).

In order to collect the number of commercials needed, ad spaces could be sold to small businesses, using a commission structure, e.g., when those ads are played. Influencers could optionally upload their own commercial and buy a bulk number of views to show any given demographic. Or, a pay per view option could be available to extremely niche industries.

Business Example

With reference to the FIGURES generally, and by way of non-limiting example, a user downloads an application to their remote processing device 104 (e.g., smartphone). The user works through a graphical user interface to upload information to the interaction engine 110, which can be stored in the user content data source 116. This could, for instance, make the user a 1099 individual (e.g., independent contractor).

Information includes preferences of categories, payment information, and any other questions that would pinpoint what ads that are suitable for consumption. In an example embodiment, a "wizard" or set of questions can be utilized to elicit the categories. By way of example, questions such as "Which industries are you most interested in?" "What is your monthly spending allotment?" "In which category was your last purchase made?" etc.

As noted more fully herein, in a working embodiment, there are 20, 3-minute segments per hour. One "block" of 3 minutes provides 11 fifteen second ad spaces, or 165 seconds of ad time. The 12th, and final, 15 second segment of the 3-minute block, would be a payment redemption period, instructing the user to answer a question. Example: "Of the previous 11 companies you saw, which would you be most willing to visit?" etc. In this example, for the user to redeem payment, there are two contingencies that must be met.

First, a specific threshold of volume detection must be present. This volume level requirement ensures that the advertisement would be heard within a specific radius of space. After 165 seconds of ads are played, the final 15 seconds requires the user to click an answer on the screen.

This equates to 20 clicks per hour from any user. Should either contingency not be met, the user would not redeem payment, or "misclick".

Example Monetization

By way of illustration as to how this system can be used to pay users for attention, assume that $0.0455+X per advertisement is the cost for any company wanting to advertise on this application (X being the additional cost needed for maintenance of the application). 11×$0.0455+X per play=$0.5005+X per 3-minute block. This happens 20 times an hour, giving the user potential earnings of $10.00 per hour.

An additional $0.01 per play for maintenance changes the cost to $0.0555 per play, or $55.50 per 1000 views. That $0.01 per play would generate $2.20 per hour per remote processing device. With a $60-dollar daily allotment, a user could view up to 6 hours of ads, or 1,320 advertisements if the user does not misclick.

Doing that 365 days a year would generate roughly $4,800 a year, per phone for maintenance costs.

$5 per 1000 views is the average cost for advertising on television, and roughly $9.50 per 1000 for YouTube.

The above-implementation costs $45.50+X for 1000 pinpointed views. While the application is more expensive, it can greatly increase the chance of the ad being heard and the name of the company being seen by users while redeeming payment.

Moreover, "Misclicks" may not be 0. Each misclick can generate $0.5005 additional revenue.

Volume detection threshold is contingent on internal vs. external registration. —Each advertisement would need a specific format.

Miscellaneous

In some embodiments, any company (including individuals, non-profits, corporations, etc.) may provide content items (e.g., a commercial, message, etc.). In some embodiments, the interaction engine 110 (FIG. 1) may be able to generate content (contingent on in-house production company availability). Regardless, a content item (e.g., commercial, announcement, advertisement, information), may need to be in a certain format and/or conform to other requirements (e.g., the time limit) to be able to be delivered as a block of content. In some embodiments, based on the company's selection, their block of content will be placed within a category. Example categories include Travel, Food, Fashion, Tools, Music, Careers, etc.

In some embodiments, the format of a company's content is analyzed by the interaction engine 110 to ensure that the provided content is suitable for application to a perceptual threshold. For instance, in some embodiments, the content should not register quieter than a specific threshold, because the user's phone needs to be at a specific setting (e.g., percentage), to trigger an auditory registration based upon a perceptual threshold.

In some embodiments, the 15 second question slot may be comprised of random meditation tones (e.g., six tones), which allow the user to recognize no words are being spoken, attracting their attention to answer the question.

In an example implementation, the user's remote processing device 104 (FIG. 1) (e.g., smartphone), will send contingency confirmation(s) to the server 102 (e.g., to the interaction engine 110), enabling the interaction engine to verify that the criteria for attention was satisfied.

Should a contingency not be met, the content provider can be made aware that the user did not meet the threshold requirement for showing attention. In the case of compensation, a company buying the ad space will still be charged (e.g., when their advertisement has played). However, the user will not be paid for the previous 3-minute segment. The 3-minute segment/cycle will happen 20 times per hour, giving the application two hundred and twenty 15 second slots to sell. The remaining 20 slots will be allocated for the question segment.

In applications such as education, should a contingency not be met, the content provider can be made aware that the user did not meet the threshold requirement for showing attention. This may trigger a number of workflows. For instance, in the education application, the failure to demonstrate an attention may require the user to revisit the block of content, etc.

In applications such as medical/healthcare, etc., should a contingency not be met, the content provider can be made aware that the user did not meet the threshold requirement for showing attention. This may trigger a number of workflows, such as to mail paper pamphlets to the user, such as where the block of content relates to therapy/exercises, etc. The workflow may also comprise an electronic alert to be sent to a healthcare provider, such as where the user did not demonstrate the required attention to ensure that the user understood correct daily dosages of a prescription, etc.

User Data Collection

Yet further, the graphical user interface 700 on the user's remote processing device 104 (FIG. 1) can enable the user to provide information to the interaction engine 110. For instance, in an example implementation, the user can input information, e.g., necessary to enter data into the user data source 116 (FIG. 1), user data 300 FIG. 3), etc., as described more fully herein.

Example in a Survey Format

Figure 8:
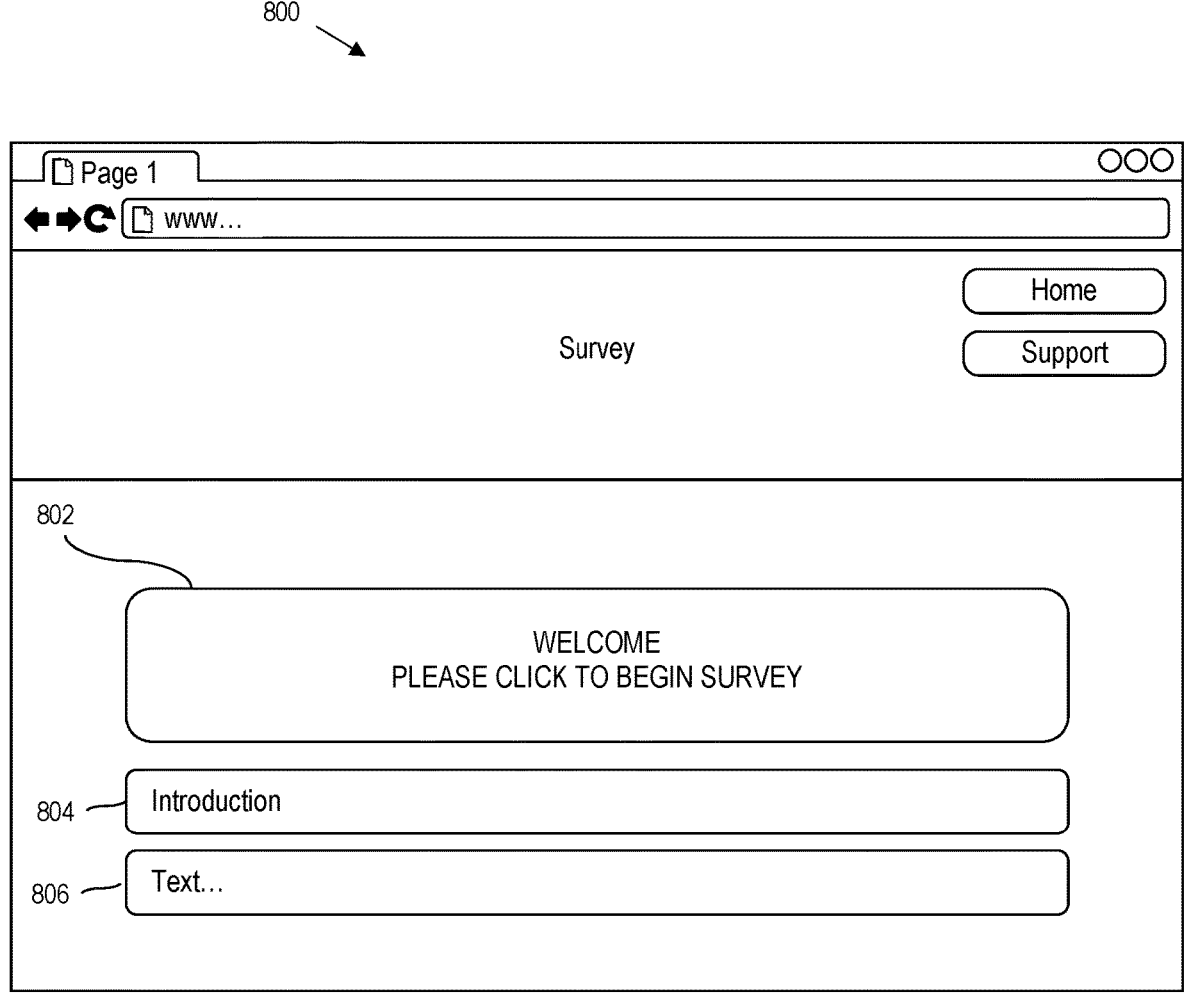
FIG. 8 is a sample user interface screen of a web browser running on a computer processing device illustrating another example implementation for tracking on-line digital content consumption as part of a survey, according to aspects of the present disclosure herein.

Referring to FIG. 8, another example is provided in the context of a survey. In this regard, the survey is based upon/derived from concepts similar to the questions/polling questions described above with reference to the "Contingencies" section. Here, the survey can be a customer survey, patient survey (e.g., in a medical application), a student survey (e.g., in an educational application, etc.).

In practical applications, a user engages with a survey via a graphical user interface 800. The graphical user interface 800 is implemented on a remote computer device 104 (FIG. 1). For sake of convenient explanation, the graphical user interface 800 is illustrated as a display within a web browser. However, the graphical user interface 800 can also be implemented within a custom app, a program, etc., running on the remote computer device 104.

For instance, as illustrated, the graphical user interface 800 presents a welcome/start screen. This screen may appear after a user logs onto the system and demonstrates appropriate credentials, etc. Regardless, in the illustrated example, the user can select a button 802 to start the survey. Optional box 804, 806 can be provided, for instance, to provide introductory information, background information, instructions, etc.

In some embodiments, the user can log onto a website from a remote processing device to take the survey. In other embodiments, the survey can be electronically communicated to a user's computer device (e.g., a smartphone), such as via a text message, link, email, program loaded and launched locally on the user's device, etc.

As another example, a system can implement a software as a service that serves to identify inconsistencies in conventional user (e.g., customer, student, patient, etc.) interactions.

For instance, in the context of a pharmaceutical application, the system can identify "pain points" that limited distribution drug manufacturers may not be aware of by unskewing data, such as by checking perception indicators in survey questions. Here, the end user can be a patient asked to take a survey, watch an informational video, etc. "Unskewing" this data will take place when enough data is gathered from patients to find patterns that contradict that information being submitted by pharmacies to the pharmaceutical companies and/or health care providers. Thus, the attention measures herein can be utilized to gain confidence in the accuracy of data, data can be corrected, etc. By gaining confidence in data, improper, inaccurate, and incomplete data can be unskewed.

As a practical example, in some embodiments, the survey is a user survey issued by a medical care provider, pharmaceutical, pharmacy, etc. By way of example, a pharmacy, pharmaceutical manufacturer, health care provider, etc., can provide a survey to a patient taking a prescription drug to gain insights into how much the patient knows about the drug, e.g., treatments, side effects, dosages, symptoms, etc.

As illustrated, a user loads a starting screen on their remote processing device (e.g., smartphone, tablet, computer, etc.). The starting screen is optional, but may be utilized to provide welcome information, to provide introductory or background information, to collect Health Insurance Portability and Accountability Act (HIPAA) consent data, etc.

In some embodiments, the optional starting screen includes a button 802, selection, icon, graphical element, etc., that requires a user interaction to advance to the actual survey. For instance, by electronically detecting that the user entered an input (e.g., clicked a button, pressed a graphical icon, entered a gesture input, etc.), the system can log a first feedback by the user, indicating that the user has focused attention on the start of the survey. Thus, the system can identify and log a first user perception, touch in this example.

Moreover, the box 804 can be used to either provide text, collect additional information, etc. By way of example, box 804 can be used to collect HIPAA consent from the user. Similarly, box 806 can be used to provide information, such as to provide instructions to the user on how to set up the remote processing device 104 to ensure that the user obtains perceptual credit, e.g., by enabling a camera, by turning up a volume, etc.

Figure 9:
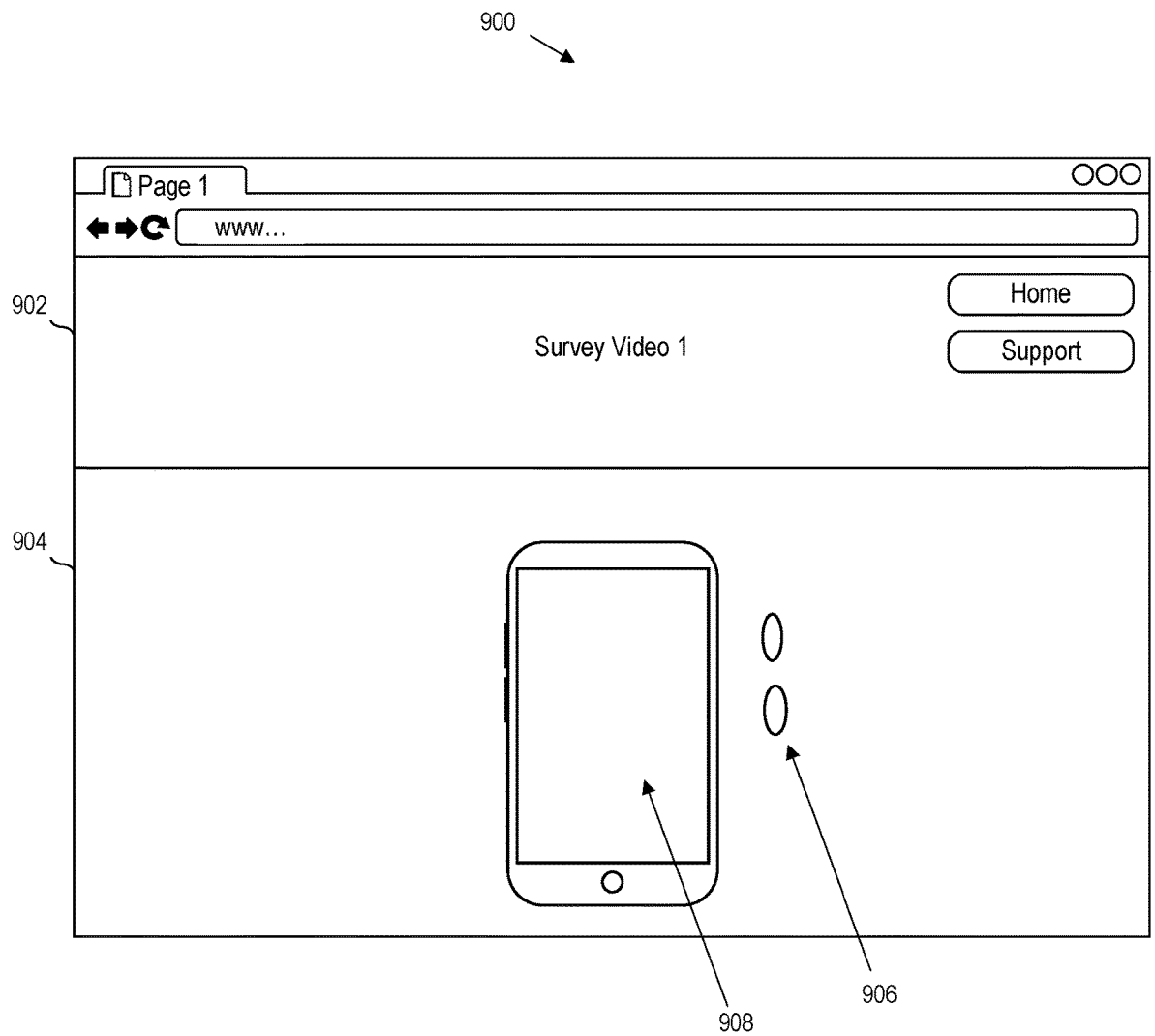
FIG. 9 is a sample user interface screen of the web browser running on the computer processing device illustrating another example implementation for tracking on-line digital content consumption as an optional video within the survey, according to aspects of the present disclosure herein.

Referring to FIG. 9, in some embodiments, the user may be required to watch a video, read a document/text, view an image, or otherwise consume digital content before answering survey questions. This can be carried out after the user engages the start button 802 (FIG. 8). The display content of FIG. 9 is thus also implemented on the user's remote computer device 104 (FIG. 1). For sake of convenient explanation, the graphical user interface 900 is illustrated as a display screen within the web browser shown in FIG. 8. However, the graphical user interface 900 can also be implemented within a custom app, a program, etc., running on the remote computer device 104, etc., as noted more fully above.

This first block of content implemented as a video, is an optional step, but provides a means for presenting content to the user for which a survey result can be derived. That is, at least one survey question can test the user's comprehension of the delivered digital content.

As illustrated, a graphical user interface 900 presents a survey 902 that includes a content display area 904. The content display area 904 can display a previously prepared video, display text, an image, or other digital content. In some embodiments, the content display area 904 also includes a user interface control section 906. The user interface control section 906 can optionally require a positive action on the part of the user in order to begin interacting with the content.

For instance, in an example implementation, in order to begin the video, a user may be prompted to engage a control in the control section 906. As an illustration, the video can be initially faded to a screen void of content, blurred, faded, etc.

As illustrated, a video playback region 908 is schematically shown to look like a smartphone. In this regard, in the case of a web browser on a general purpose computer, laptop, etc., the control section 906 can provide virtual controls that can be touched (if using a touchscreen), clicked with a mouse or other pointer, etc. In the case of the remote processing device 104 being a smartphone, the control section 906 can be physical buttons on the phone, or virtual buttons on the touch screen of the phone. Likewise, the video playback region 908 can take any aesthetic in the case of a desktop computer, tablet computer, etc., or the video playback region 908 can be the entire screen or any portion thereof when implemented on a smartphone.

Keeping with the above-example, when a user presses a button in the control section 906, a processor of the remote processing device controls a display screen brightness such that the screen brightness increases. Thus, the screen brightness can transition from off or a relatively low level, to a brightness sufficient to enable the user to watch the video. That is, user interaction with the user interface control section 906 causes the screen to brighten sufficient to view the content in the content display area 906. Thus, the system can record a user perception (perceptual indicator), e.g., sight/visibility of the content on the screen, by virtue of the transition of the brightness of the screen sufficient to consume the content. Here, a perception indicator may comprise a minimum screen brightness. The system can also determine if a contingency is satisfied, e.g., by measuring or recording whether the user pressed the button in the control section 906 to brighten the display to the minimum brightness determined by the perception threshold. Analogously, the user may be required to press a control button that turns up the audio (or the system can verify that the audio is at a suitable level to satisfy an auditory perceptual indicator). Other perception thresholds and associated perception indicators can be implemented alone, or in combination, as set out in greater detail herein.

In some embodiments, the control section 906 includes controls to start, pause, rewind, play, increase/decrease volume, adjust brightness, etc. the video content. The control section 906 can also include a "next" button to advance to the next screen.

Figure 10:
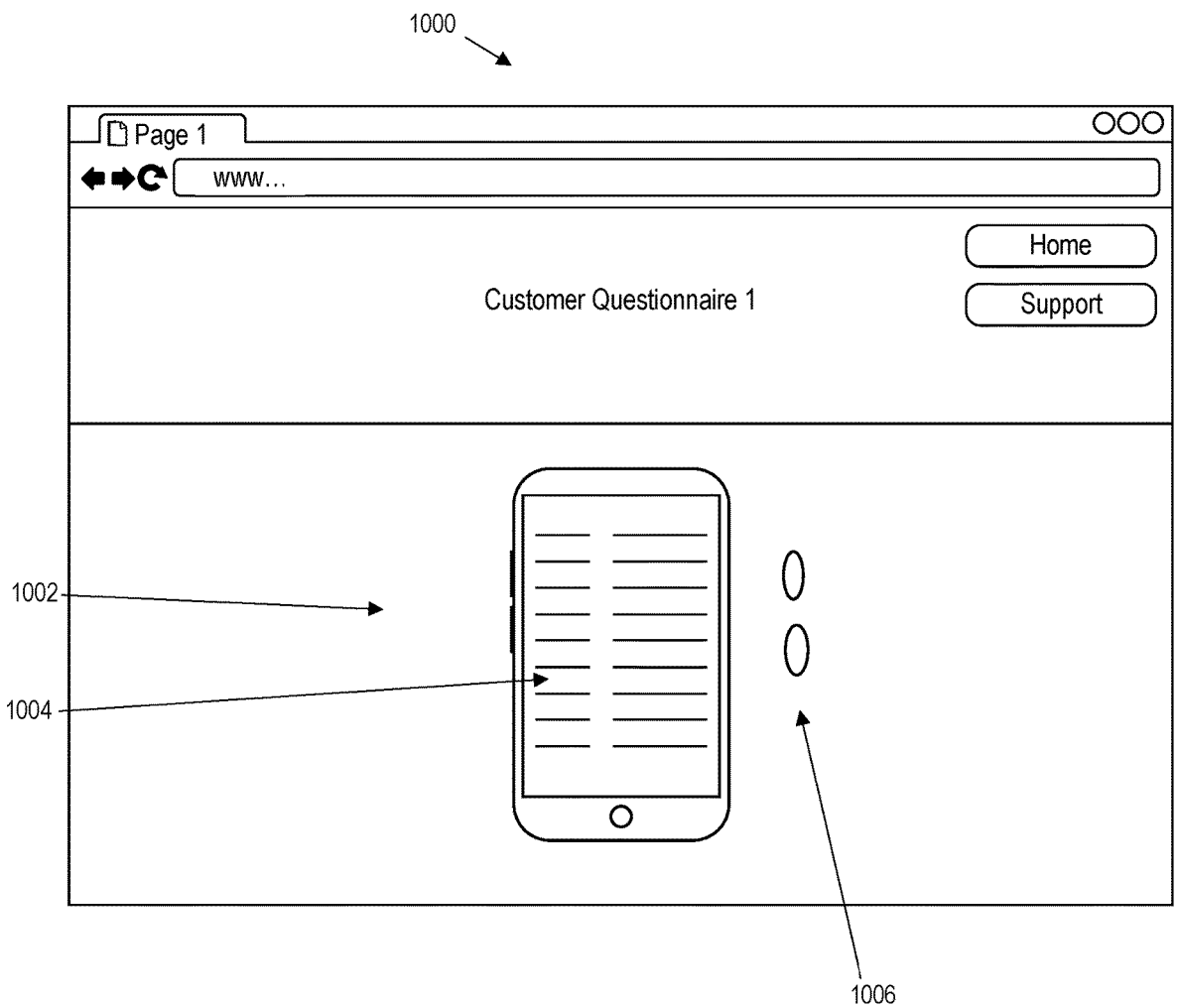
FIG. 10 is a sample user interface screen of the web browser running on the computer processing device illustrating another example implementation for tracking on-line digital content consumption as part of a questionnaire within the survey, according to aspects of the present disclosure herein.

Referring to FIG. 10, a graphical user interface 1000 includes a display section 1002 to present to the user, on the user's remote processing device, one or more survey questions 1004. The screen shown in FIG. 10 can transition after the user has watched the video in FIG. 9, for example. Here, the system can collect a perceptual indicator and/or post block verification measure in several ways, such as by collecting a correct answer to one or more of the survey questions, by receiving a correctly completed survey within a prescribed time period, etc. Here, the perception indicator may comprise a correct answer to a specific question, completion of the questions in a predetermined amount of time, a feedback about a topic covered by the block of content, etc.

As described more fully herein, perceptual indicators and thresholds can be persistent or otherwise introduced throughout the user's interaction with this survey. For instance, with regard to the questions in FIG. 10, the user may be required to complete the questions in a prescribed amount of time, the user may be required to provide correct answers to one or more questions, the user may be instructed to enter a code, press a specific key sequence, etc., to verify that the user has paid attention to the video and/or to the questions themselves. As such, any techniques described more fully herein can be utilized to collect measures or indications of attention, e.g., perceptual indicators, post block verification measures, or a combination thereof. Moreover, the specific perception thresholds can be scaled, tuned, or otherwise adjusted based upon a relative expectation of level of attention.

An optional controls section 1006 can provide navigation tools, e.g., to advance to the next screen, to go back to the previous screen, e.g., to re-watch the video, etc.

Figure 11:
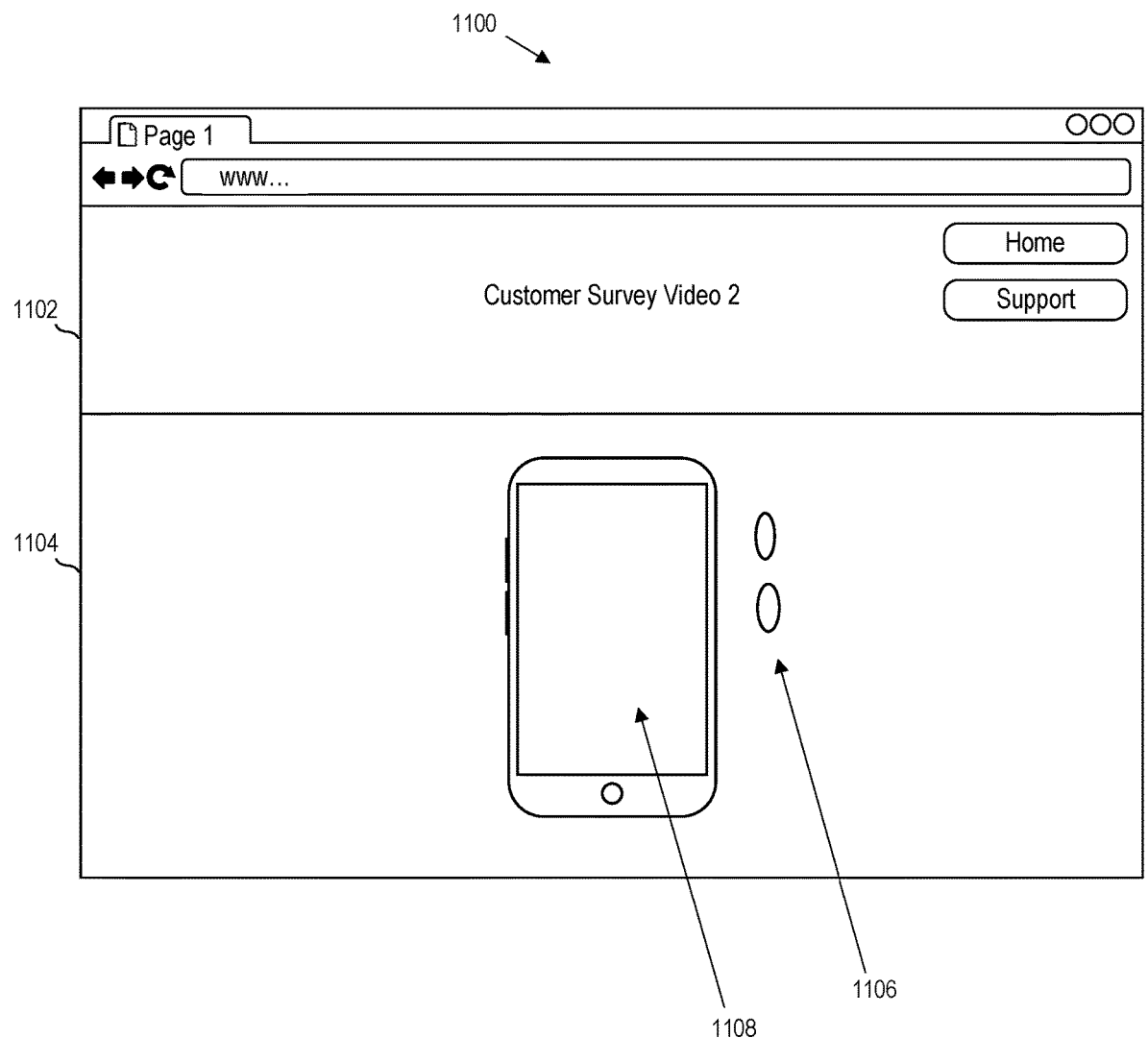
FIG. 11 is a sample user interface screen of the web browser running on the computer processing device illustrating another example implementation for tracking on-line digital content consumption as an optional second video within the survey, according to aspects of the present disclosure herein.

Referring to FIG. 11, in some embodiments, a graphical user interface 1100 may present to the user, a mid-survey video, read a document/text, view an image, or otherwise consume digital content before answering survey questions. This is an optional step, but provides a means for presenting content to the user for which a survey result can be derived. That is, at least one survey question can test the user's comprehension of the delivered digital content.

Regardless, the mid-survey video can be carried out after the user completes the survey questions described more fully with regard to FIG. 10. The display content of FIG. 11 is thus also implemented on the user's remote computer device 104 (FIG. 1). For sake of convenient explanation, the graphical user interface 1100 is illustrated as a display screen within the web browser shown in FIG. 8. However, the graphical user interface 1100 can also be implemented within a custom app, a program, etc., running on the remote computer device 104, etc., as noted more fully above.

As illustrated, a graphical user interface 1100 presents a survey 1102 that includes a content display area 1104. The content display area 1104 can display a previously prepared video, display text, an image, or other digital content. In some embodiments, the content display area 1104 also includes a user interface control section 1106. The user interface control section 1106 can optionally require a positive action on the part of the user in order to begin interacting with the content.

For instance, in an example implementation, in order to begin the video, a user may be prompted to engage a control in the control section 1106. As an illustration, the video can be initially faded to a screen void of content, blurred, faded, etc.

As illustrated, a video playback region 1108 is schematically shown to look like a smartphone. In this regard, in the case of a web browser on a general purpose computer, laptop, etc., the control section 1106 can provide virtual controls that can be touched (if using a touchscreen), clicked with a mouse or other pointer, etc. In the case of the remote processing device 104 being a smartphone, the control section 1106 can be physical buttons on the phone, or virtual buttons on the touch screen of the phone. Likewise, the video playback region 1108 can take any aesthetic in the case of a desktop computer, tablet computer, etc., or the video playback region 1108 can be the entire screen or any portion thereof when implemented on a smartphone.

Keeping with the above-example, when a user presses a button in the control section 1106, a processor of the remote processing device controls a display screen brightness such that the screen brightness increases. Thus, the screen brightness can transition from off or a relatively low level, to a brightness sufficient to enable the user to watch the video. That is, user interaction with the user interface control section 1106 causes the screen to brighten sufficient to view the content in the content display area 906. Thus, the system can record a user perception (perceptual indicator), e.g., sight/visibility of the block of content, by virtue of the transition of the brightness of the screen sufficient to consume the content. The system can also determine if a contingency is satisfied, e.g., by measuring or recording whether the user pressed the button in the control section 1106 to brighten the display to a brightness level that satisfies a predetermined perceptual threshold, e.g., brightness at least 50%. Analogously, the user may be required to press a control button that turns up the audio (or the system can verify that the audio is at a suitable level to satisfy an auditory perceptual indicator).

In some embodiments, the control section 1106 includes controls to start, pause, rewind, play, increase/decrease volume, adjust brightness, etc. the video content. The control section 1106 can also include a "next" button to advance to the next screen.

Analogous to that described with reference to FIG. 9, this screen presents an optional block of content, implemented as a video in this example. The video provides a way for the system to collect at least one perceptual indicator, as described more fully herein.

Figure 12:
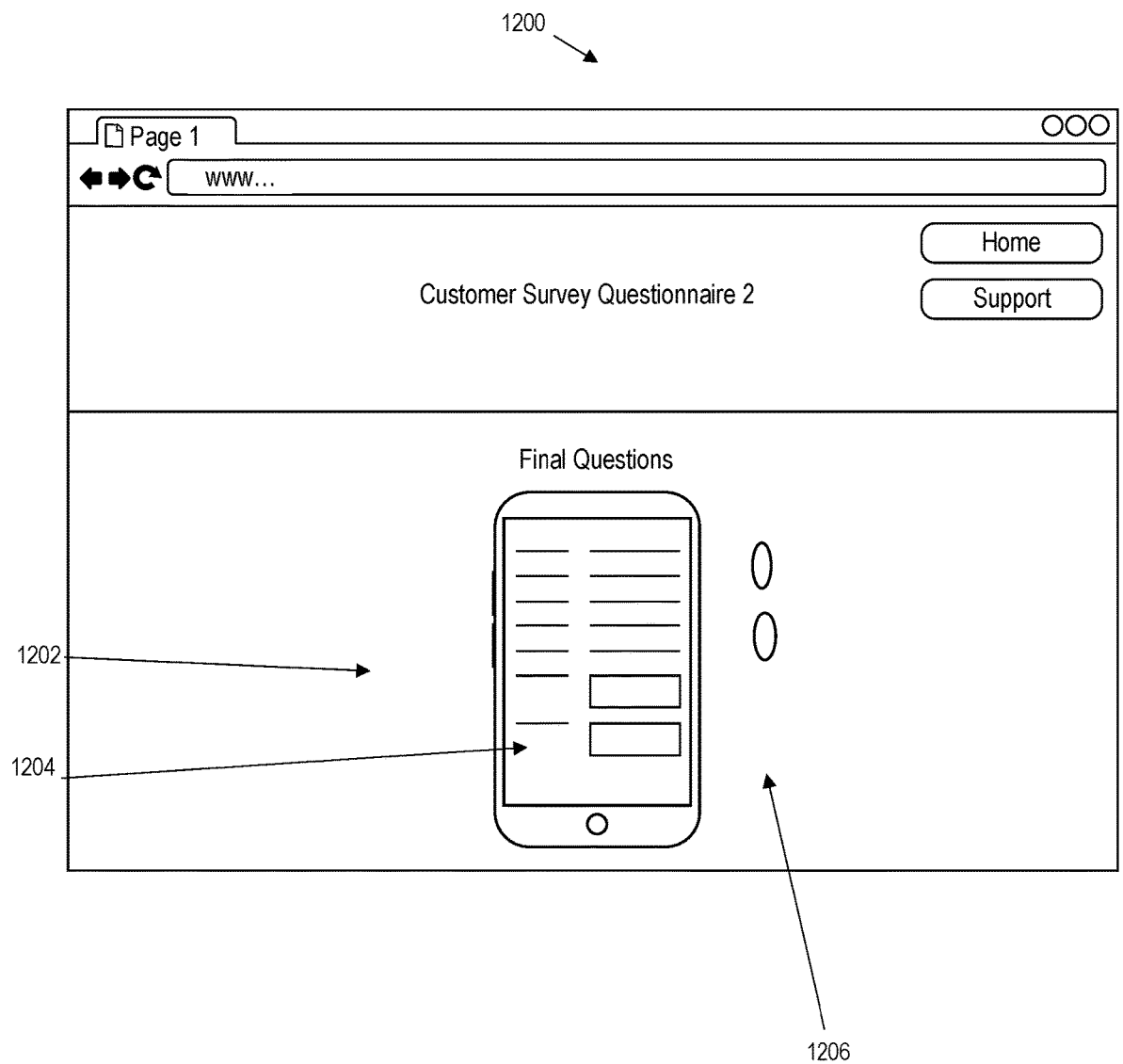
FIG. 12 is a sample user interface screen of the web browser running on the computer processing device illustrating another example implementation for tracking on-line digital content consumption as part of an optional second questionnaire within the survey, according to aspects of the present disclosure herein.

Referring to FIG. 12, a graphical user interface 1200 includes a display section 1202 to present to the user, on the user's remote processing device, one or more survey questions 1204. The screen shown in FIG. 12 can transition after the user has watched the video in FIG. 11, for example. Here, the system can collect a perceptual indicator and/or post block verification measure in several ways, such as by collecting a correct answer to one or more of the survey questions, by receiving a correctly completed survey within a prescribed time period, etc.

As described more fully herein, perceptual indicators and thresholds can be persistent or otherwise introduced throughout the user's interaction with this survey. For instance, with regard to the questions in FIG. 12, the user may be required to complete the questions in a prescribed amount of time, the user may be required to provide correct answers to one or more questions, the user may be instructed to enter a code, press a specific key sequence, etc., to verify that the user has paid attention to the video and/or to the questions themselves. As such, any techniques described more fully herein can be utilized to collect measures or indications of attention, e.g., perceptual indicators, post block verification measures, or a combination thereof.

An optional controls section 1206 can provide navigation tools, e.g., to advance to the next screen, to go back to the previous screen, e.g., to re-watch the video, etc.

Figure 13:
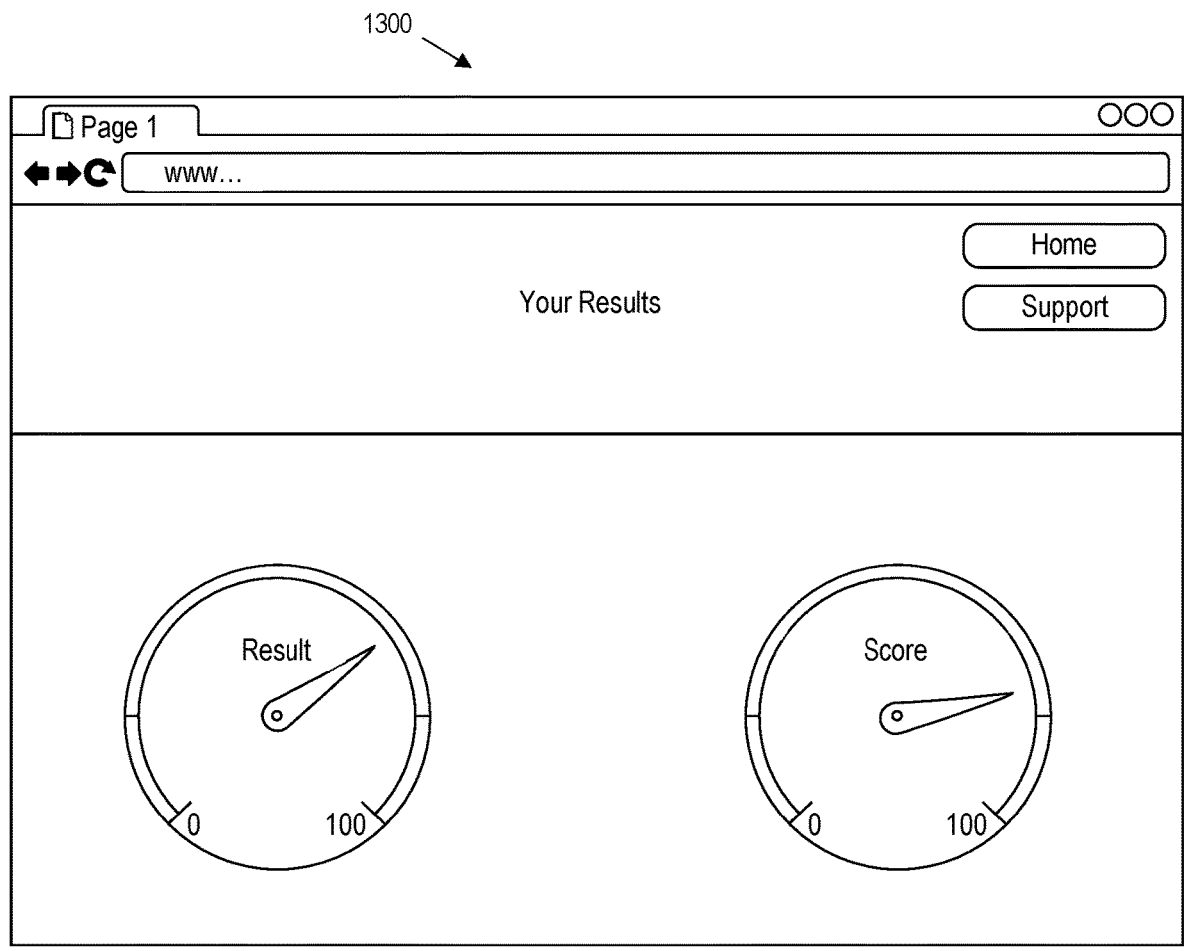
FIG. 13 is a sample user interface screen of the web browser running on the computer processing device illustrating a dashboard, according to aspects of the present disclosure herein.

Referring to FIG. 13, an optional results screen 1300 can be presented to the user's remote processing device 104 to show the user's interaction with the system, e.g., to score the user's attention to provide.

Attention to Digital Blocks of Content

Providers such as companies that generate digital content (e.g., on-line commercials) typically place their advertisements on platforms without the guarantee or at least a likelihood of capturing the attention of users/consumers. That is, companies buying ad space cannot know if the advertisement is being heard or paid attention to. However, a solution herein is to implement a perceptual threshold with contingencies to ensure within a reasonable doubt that the user is paying attention to, or at least has the opportunity to pay attention to a block of digital content. This may be realized through auditory, visual, required feedback, a combination thereof, etc. In some embodiments, multiple contingencies with independent thresholds can be associated with a block of content to control the likelihood that the user paid attention to the block of content. As such, systems and processes are provided herein to detect, measure, validate compensate, combinations thereof, the exchange of attention.

With regard to FIG. 8-13 generally, the method of detecting a user's attention when consuming digital content described more fully herein, is illustrated from the user's perspective. For instance, the user's remote processing device 104 (e.g., smartphone, computer, etc.) electronically receives a block of content from a remote source, e.g., the interaction engine 110 (FIG. 1). In this case, several blocks of content, a new/different block of content for each screen FIG. 8 through FIG. 12. The block of content of video at FIG. 9 and FIG. 12 each have a known content playback duration, and a post block verification duration.

Software, either on the user's processing device or the remote server electronically detects a perception indicator of the user interacting with a block of content on the remote processing device. As noted more fully herein, the perception indicator corresponds to a detection of attention paid by the user to the block of content on the remote processing device. This can happen by clicking the start survey button (FIG. 8), pressing a control to start the video and increase the brightness of the video, turn up the volume, etc. (FIG. 9), answer a question (FIG. 10), pressing a control to start the video and increase the brightness, turn up the volume, etc. (FIG. 11), answer a question (FIG. 12), etc.

The system generates a contingency result, where the contingency result is based upon a comparison of the perception indicator to a perception threshold. For example, a perception threshold may comprise turning up the audio to above 50% to watch the video (FIG. 9, FIG. 11), turning up the brightness to be able to view the video (FIG. 9, FIG. 11), etc. The system further sends a communication to at least one of the remote processing device or a remote server associated with the block of content, where the communication comprises an indicator of the contingency result. This can be seen in the scoring/dashboard (FIG. 13).

For example, analytics can visualize the user's "real" result, or "attention score". The attention score can visualize in a display screen, a measure of attention. In the application of a pharmaceutical, the attention score can, for example, provide an indicator of whether the user is likely to follow through with the treatment and consistently refill their prescriptions when needed.

As a non-limiting example, a scoring can be implemented as the user interacts with the system, e.g., via the screens in FIG. 8-FIG. 13 or other suitable content. By way of example, perception indicators can include display screen brightness (0/1 points available where the setting either is below (0) or above (1) the threshold); volume setting (0/1 points available where the setting either is below (0) or above (1) the threshold; number of questions answered (0/X); Mouse cursor distance monitoring (0<x<z<y possible 0/1-3 points available where the mouse cursor position satisfies or fails to satisfy an associated perception threshold (designated by mouse position); time spent on each screen (0<x<y<z possible 0/1-3 points available); optional voice recognition to capture a user's speech, etc. Assuming a total point system of 0-10 depending on the metrics set, this scoring can be used to show the user(s) that pay the most attention.

In embodiments, the system can also conduct post block verification via post block verification measures built into the questions (FIG. 10, FIG. 12). In some embodiments, the system performs a post block verification, where the post block verification begins immediately after playback of the video blocks of content and lasts the post block verification duration. The system correspondingly receives feedback during the post block verification process, and determines a contingency result, the contingency result based upon the comparison of the perception indicator to the perception threshold, and the received feedback. For instance, in some embodiments, the user may only receive attention credit if the questions are answered within the post block verification duration. In other embodiments, the user may receive poser verification where the post video question(s) are answered correctly, are answered with specific answers, where feedback is provided, etc., as described in greater detail herein.

Example Computer System

Figure 14:
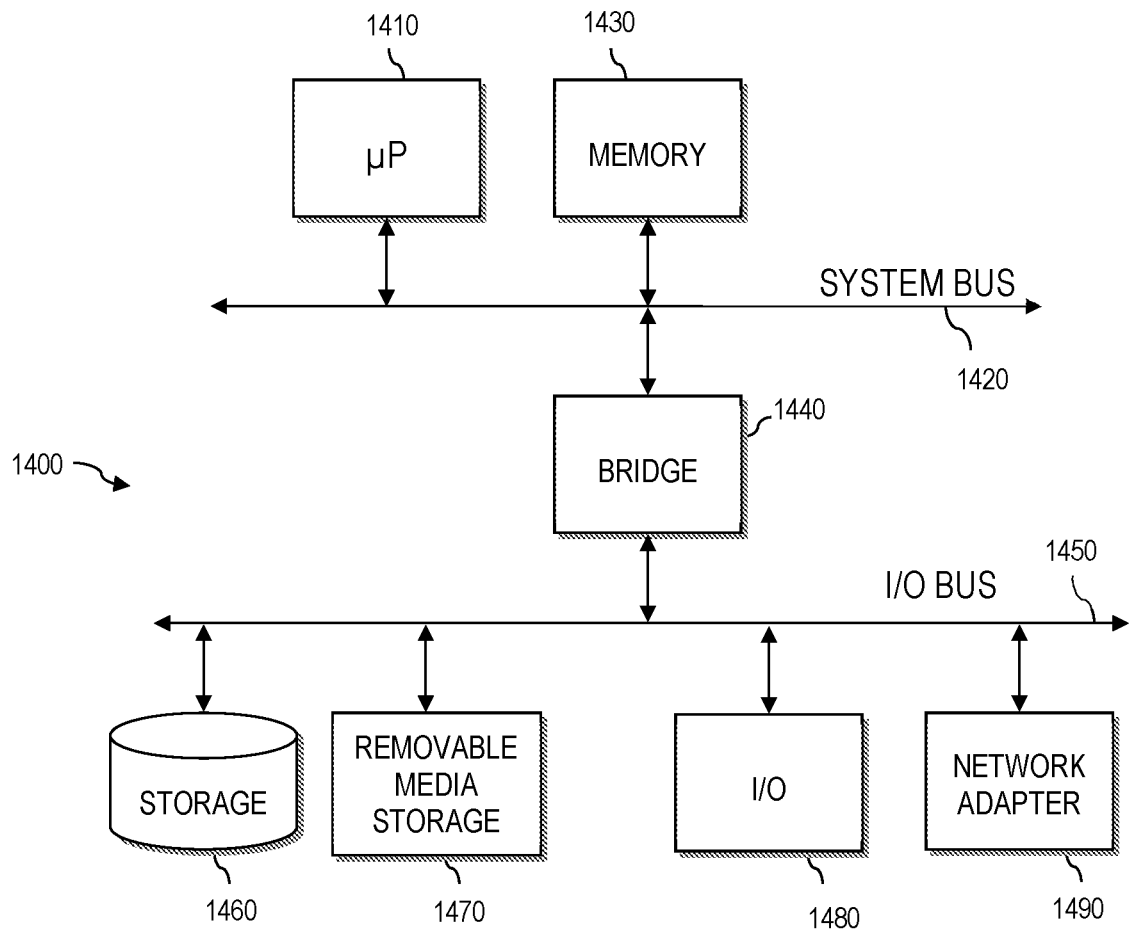
FIG. 14 is a block diagram of a computer system having a computer readable storage medium for implementing functions according to various aspects of the present disclosure as described in greater detail herein.

Referring to FIG. 14, a block diagram of a hardware data processing system is depicted in accordance with the present disclosure. Data processing system 1400 may comprise a symmetric multiprocessor (SMP) system or other configuration including a plurality of processors 1410 connected to system bus 1420. Alternatively, a single processor 1410 may be employed. Also connected to the system bus 1420 is local memory 1430. An I/O bus bridge 1440 interfaces the system bus 1420 to an I/O bus 1450. The I/O bus 1450 is utilized to support one or more buses and corresponding devices, such as storage 1460, removable media storage 1470, input/output devices 1480, network adapters 1490, other devices, combinations thereof, etc. For instance, a network adapter 1490 can be used to enable the data processing system 1400 to communicate with other data processing systems or remote printers or storage devices through intervening private or public networks.

The memory 1430, storage 1460, removable media storage 1470, or combinations thereof can be used to store program code that is executed by the processor(s) 1410 to implement any aspect of the present disclosure described and illustrated in FIGS. 1-7.

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A method of tracking a user's consumption of digital content, comprising:
   communicating a block of content to a remote processing device for playback thereon, the block of content having a known content playback duration, the block of content also having associated therewith, a post block verification duration;
   collecting, during playback of the block of content on the remote processing device, a perception indicator;
   comparing the collected perception indicator against a perception threshold;
   performing a post block verification, the post block verification beginning immediately after playback of the block of content and lasting the post block verification duration;
   receiving feedback during the post block verification process; and
   determining a contingency result, the contingency result based upon the comparison of the perception indicator to the perception threshold, and the received feedback;
   wherein: determining a contingency result, the contingency result based upon the comparison of the perception indicator to the perception threshold, and the received feedback, comprises triggering an automated electronic transaction if a user of the remote processing device satisfied both a first contingency, corresponding to the comparison of the perception indicator to the perception threshold, and a second contingency, corresponding to detecting that valid feedback was received within the post block verification duration.

2. The method of claim 1 further comprising:
   receiving a request from a remote processing device to begin receiving content by receiving the request responsive to a user launching an app on the remote processing device and logging onto a content platform.

3. The method of claim 1 further comprising:
   assembling the block of content as a set of video content items.

4. The method of claim 3, wherein:
   assembling the block of content as the set of video content items, comprises assembling the block of content as the set of video content items such that each content item is associated with a predefined category of content.

5. The method of claim 3, wherein:
   assembling the block of content comprises assembling the block of content as a set of video content items, each content item having the same duration of playback.

6. The method of claim 1, wherein:
   collecting, during playback of the block of content on the remote processing device, a perception indicator, comprises:
   reading a value corresponding to a position of a volume control on the remote processing device.

7. The method of claim 6, wherein:
   comparing the collected perception indicator against a perception threshold comprises comparing the collected perception indicator to the perception threshold implemented as a predetermined minimum volume control setting.

8. The method of claim 1, wherein:
   collecting, during playback of the block of content on the remote processing device, a perception indicator, comprises:
   reading a value corresponding to a position of a volume control on the remote processing device a number of times during playback of the block of content.

9. The method of any one of claim 8, wherein:
comparing the collected perception indicator against a perception threshold comprises comparing the collected perception indicator to the perception threshold implemented as a predetermined minimum volume control setting.

10. The method of claim 1, wherein:
collecting, during playback of the block of content on the remote processing device, a perception indicator, comprises measuring an output level of audio corresponding to the playback of the block of content.

11. The method of claim 1, wherein:
comparing the collected perception indicator against a perception threshold comprises comparing the collected perception indicator to the perception threshold implemented as a predetermined minimum measured decibel level.

12. The method of claim 1, wherein:
collecting, during playback of the block of content on the remote processing device, a perception indicator, comprises:
 enabling a camera on the remote processing device; and
 capturing an image of a user of the remote processing device; and
comparing the collected perception indicator against a perception threshold comprises:
 applying a facial evaluation algorithm that verifies whether the user's eyes are directed towards a display screen of the remote processing device that is playing back the block of content.

13. The method of claim 1, wherein:
collecting, during playback of the block of content on the remote processing device, a perception indicator, comprises:
 performing a predetermined number of times during playback of the block of content:
  enabling a camera on the remote processing device; and
  capturing an image of a user of the remote processing device;
 comparing the collected perception indicator against a perception threshold comprises:
  applying a facial evaluation algorithm that verifies whether the user's eyes are directed towards a display screen of the remote processing device that is playing back the block of content.

14. The method of claim 1, wherein:
collecting, during playback of the block of content on the remote processing device, a perception indicator, comprises:
 performing throughout the entirety of playback of the block of content:
  enabling a camera on the remote processing device; and
 comparing the collected perception indicator against a perception threshold comprises:
  capturing an image of a user of the remote processing device; and
  applying a facial evaluation algorithm that verifies whether the user's eyes are directed towards a display screen of the remote processing device that is playing back the block of content.

15. The method of claim 1, wherein:
performing a post block verification comprises:
 presenting on a display screen of the remote processing device, a set of options pertaining to the block of content; and
 prompting a user of the remote processing device to answer a question about the block of content; and
receiving feedback during the post block verification process comprises:
 reading whether the user provides feedback by pressing a graphical input presented on the display screen;
wherein:
 the feedback must be recorded within the post block verification duration.

16. The method of claim 1 further comprising:
automatically looping a next block of content so as to begin playing immediately after the completion of the post block verification duration.

17. A method of detecting a user's attention when consuming digital content, comprising:
electronically communicating a block of digital content to a remote processing device;
electronically detecting a perception indicator of a user interacting with the block of digital content on the remote processing device, the perception indicator corresponding to a detection of attention paid by the user to the block of digital content on the remote processing device;
generating a contingency result, the contingency result based upon a comparison of the perception indicator to a perception threshold;
sending a communication to at least one of the remote processing device or a remote server associated with the block of digital content, the communication comprising an indicator of the contingency result;
assembling the block of digital content for electronic transmission to a remote processing device, the block of digital content having a content consumption measure; and
monitoring the user's interaction with the block of digital content to determine whether the content consumption measure was satisfied;
wherein: generating the contingency result further comprises basing the contingency result upon the comparison of the perception indicator to the perception threshold, and based upon the determination of whether the content consumption measure was satisfied.

18. The method of claim 17 further comprising:
associating a post block verification measure to the block of digital content; and
monitoring the user's interaction with the remote processing device after consuming the block of digital content to determine whether the post block verification measure was satisfied;
wherein: generating the contingency result further comprises basing the contingency result upon the comparison of the perception indicator to the perception threshold, based upon the determination of whether the content consumption measure was satisfied, and based upon the determination of whether the post block verification measure was satisfied.

19. The method of claim 17 further comprising:
associating a post block verification measure to the block of digital content; and
monitoring the user's interaction with the remote processing device after consuming the block of digital content to determine whether the post block verification measure was satisfied;

wherein: generating the contingency result further comprises basing the contingency result upon the comparison of the perception indicator to the perception threshold, and based upon the determination of whether the post block verification measure was satisfied.

\* \* \* \* \*